United States Patent
Noonan et al.

(10) Patent No.: US 12,383,878 B1
(45) Date of Patent: Aug. 12, 2025

(54) SYSTEMS AND METHODS FOR MONITORING ORBITAL SHAKER HEALTH

(71) Applicant: SomaLogic Operating Co., Inc., Boulder, CO (US)

(72) Inventors: Patrick S. Noonan, Golden, CO (US); Michael Barich, Berthoud, CO (US); Maarten Rutgers, Los Angeles, CA (US); Jake Bloom, Boulder, CO (US); Robert Walder, Boulder, CO (US)

(73) Assignee: SomaLogic Operating Co., Inc., Boulder, CO (US)

( * ) Notice: Subject to any disclaimer, the term of this patent is extended or adjusted under 35 U.S.C. 154(b) by 0 days.

(21) Appl. No.: 18/674,415

(22) Filed: May 24, 2024

(51) Int. Cl.
  *B01F 35/00* (2022.01)
  *B01F 29/10* (2022.01)
  *B01F 35/212* (2022.01)
  *B01F 35/214* (2022.01)
  *B01F 35/32* (2022.01)

(52) U.S. Cl.
  CPC ............ *B01F 35/212* (2022.01); *B01F 29/10* (2022.01); *B01F 35/214* (2022.01); *B01F 35/3204* (2022.01)

(58) Field of Classification Search
  CPC .............................. B01F 35/212; B01F 29/10
  See application file for complete search history.

(56) References Cited

U.S. PATENT DOCUMENTS

| | | | |
|---|---|---|---|
| 7,196,491 B2 | 3/2007 | Mayhew et al. | |
| 7,222,048 B2 | 5/2007 | Petchenev et al. | |
| 7,979,240 B2 | 7/2011 | Fielder | |
| 2004/0155622 A1* | 8/2004 | Mayhew | H02P 27/024 318/778 |
| 2012/0109567 A1* | 5/2012 | Bobasheva | B01F 27/90 702/108 |
| 2018/0111102 A1* | 4/2018 | Zannoni | B01F 35/2202 |
| 2018/0307231 A1 | 10/2018 | Sorton et al. | |
| 2020/0038874 A1* | 2/2020 | Masquelier | C12M 41/18 |

* cited by examiner

*Primary Examiner* — Anshu Bhatia
(74) *Attorney, Agent, or Firm* — Kolitch Romano Dascenzo Gates LLC

(57) ABSTRACT

Systems and methods for monitoring orbital shaker health include: monitoring orbital shaker health by monitoring input current relative to stall frequency, monitoring orbital shaker health by monitoring back electromagnetic fields (EMF) supplied to the shaker, monitoring orbital shaker health by analyzing video of rotation shafts included within the shaker during orbit, and monitoring orbital shaker health by analyzing accelerometer data.

16 Claims, 15 Drawing Sheets

SYSTEMS AND METHODS FOR MONITORING ORBITAL SHAKER HEALTH

FIELD

This disclosure relates to laboratory shakers and associated systems and methods. More specifically, this disclosure refers to orbital shakers.

INTRODUCTION

Shakers are generally utilized for mixing, blending, or otherwise agitating substances in laboratory applications by vibrating or rotating a plate, tray, or nest configured to receive one or more laboratory samples. Orbital shakers agitate the tray of the shaker by rotating the tray via a rotor coupled to a drive mechanism. As the shaker is used, components included within the shaker may deteriorate due to wear and tear. Deterioration of the shaker may introduce variations within collected data, and may eventually result in shaker failure. Shaker failure while the shaker is in use may ruin an entire batch of laboratory samples, incurring costs and resulting in a loss of valuable data. A method of monitoring shaker health is needed so that shakers may be taken out of commission or repaired prior to failure.

Current methods of monitoring motor health monitor an amount of input current used by a stepper motor and convert this metric to a relative measure of torque required to move the stepper motor. However, these methods are only applicable for a limited range of stepper motor applications. For example, if the motor is being used in an assembly that requires nearly all input current to be used, the excess current will not vary significantly, limiting monitoring capabilities.

SUMMARY

The present disclosure provides systems, apparatuses, and methods relating to monitoring orbital shaker health.

In some embodiments, a method for monitoring a health of an orbital shaker includes: varying an input current delivered to a drive motor by applying two or more selected input current values to the drive motor; determining a stalling frequency of the drive motor at each selected input current; and calculating an input current above which a stalling frequency of the drive motor is zero.

In some embodiments, a method for monitoring a health of an orbital shaker includes: applying an input current to an electric motor of the orbital shaker via a power line; monitoring an operational current of the power line; and detecting negative current events (AKA back-EMF) within the power line; wherein the negative current events indicate mechanical hitches during shaker rotation.

In some embodiments, a method for monitoring a health of an orbital shaker, the method comprising: applying visual identifiers to at least one drive shaft and at least one idler shaft of an orbital shaker; tracking rotational positions of each visual identifier; and calculating angular offsets between the rotational positions of visual identifiers corresponding to the at least one drive shaft and the rotational positions of visual identifiers corresponding to the at least one idler shaft.

Features, functions, and advantages may be achieved independently in various embodiments of the present disclosure, or may be combined in yet other embodiments, further details of which can be seen with reference to the following description and drawings.

DETAILED DESCRIPTION

Figure 1:
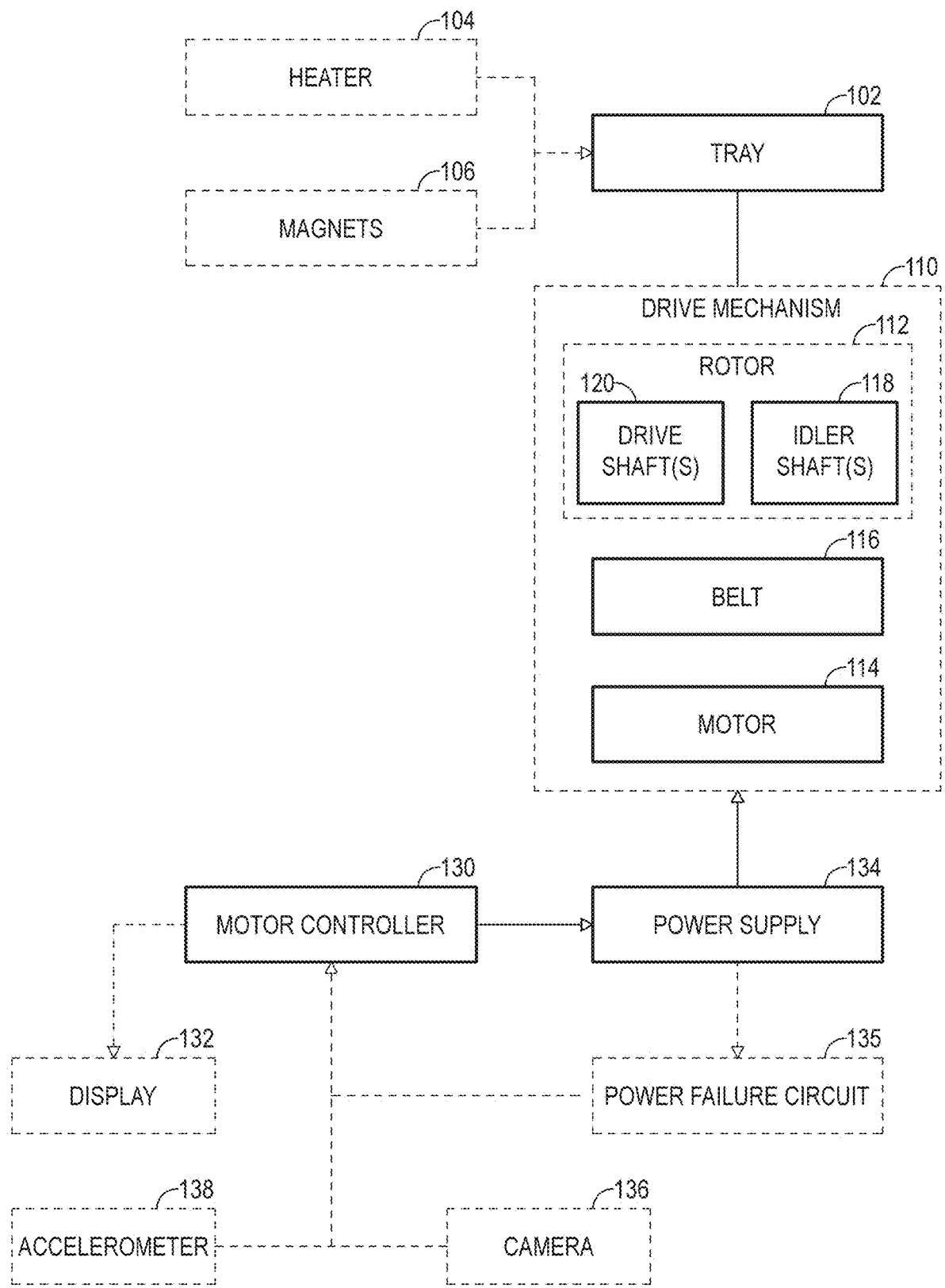
FIG. 1 is a schematic diagram of an illustrative orbital shaker in accordance with aspects of the present teachings.

Various aspects and examples of systems and methods for monitoring orbital shaker health, are described below and illustrated in the associated drawings. Unless otherwise specified, systems and methods for monitoring orbital shaker health in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, methods of monitoring the health of an orbital shaker, as well as associated systems may include one or more of the following: (a) monitoring input current relative to stall frequency, (b) monitoring back electromagnetic fields (EMF) supplied to the shaker, (c) analyzing video of rotation shafts included within the shaker during orbit, and (d) analyzing accelerometer data. Orbital shakers according to the present disclosure are designed to execute specific orbital motions to enable reproducible mixing of solutions in containers, such as 96 well plates. Deviations from these motions may lead to variation in assay performance and may indicate problems with the mechanical and electronic systems of the shaker. Each of these methods may be utilized individually or in combination to provide a complete picture of the health of an orbital shaker, informing maintenance and use decisions. In some examples, methods of monitoring the health of an orbital shaker include, in response to a measured value satisfying a threshold value, decommissioning, repairing, maintaining, and/or otherwise modifying the function of the orbital shaker.

In some examples, a method of monitoring the health of an orbital shaker by monitoring input current relative to stall frequency includes varying an input current applied to the motor, determining a stalling frequency at each input current, and calculating a current above which the stalling frequency is always zero. In other words, monitoring the health of an orbital shaker by monitoring input current relative to stall frequency measures a frequency of stalling as a function of input current to the motor to evaluate the health of the shaker. In some examples, monitoring the health of an orbital shaker by monitoring the input current relative to the stall frequency includes generating stalling curves relating input currents to stalling frequency and calculating a "zero stall point," defined as the input current above which the orbital shaker does not stall. As orbital shakers age, the input current above which the orbital shaker does not stall increases and a stalling frequency of the motor increases. Accordingly, in some examples, in response to an increase in the zero stall point, the method of monitoring may include increasing a default input current to the orbital shaker so that the default input current is above the zero stall point. In some examples, in response to the increase in the zero stall point, the method of monitoring includes decommissioning the orbital shaker when the zero stall point is higher than a maximum input current of the orbital shaker.

In some examples, a method of monitoring the health of an orbital shaker by monitoring back electromotive force (AKA counter-electromotive force, back EMF) applied to the shaker includes: applying a current to a stepper motor via a power line, monitoring the power line current (AKA phase current), and detecting negative current events. This method of monitoring the health of an orbital shaker detects negative current events resulting from mechanical hitches or resistances within shaker rotation. Accordingly, this method of monitoring the health of an orbital shaker assesses the smoothness of shaker rotation.

Shaker rotation is caused by torque delivered to a rotor that rotates the tray, plate, or nest of the shaker. In some examples, orbital shakers in accordance with the present teachings utilize stepper motors to produce the torque. Back EMF is typically generated at a constant rate during stepper motor operation. A rotating stepper motor generates back EMF as fields of magnetic poles generated by the stepper motor pass over phase windings within the stepper motor. Back EMF is a voltage that acts against a supply voltage to the stepper motor, which in-turn reduces the rise time of the phase current. A stepper motor operating at a steady state will generate back EMF at a constant magnitude relative to the supply voltage. In other words, back EMF is proportional to a rotational speed of the motor. However, sudden accelerations or decelerations in rotation caused by a mechanical catch in shaker rotation increase the back EMF, resulting in an inequality between the supply voltage and back EMF and applying negative current to the power line. This negative current is created when the back EMF is greater than the power supplied to the motor during rotation. Accordingly, in some examples, the method of monitoring the health of an orbital shaker includes monitoring current applied to the power line and detecting negative current conditions. In some examples, an increase in negative current events indicates a decrease in shaker function. Accordingly, in some examples, the method of monitoring the health of an orbital shaker includes replacing the stepper motor, performing maintenance, and/or decommissioning the shaker in response to observed negative current events.

In some examples, a method of monitoring the health of an orbital shaker by analyzing video of rotation shafts included within the shaker during orbit includes: applying visual identifiers to each shaft involved in orbit of a heater plate of the shaker, tracking rotational positions of each visual identifier; and calculating angular offsets between trajectories of each visual identifier. This method of monitoring the health of an orbital shaker detects any lag between drive and idler shafts included within the orbital shaker as an assessment of secondary motion (e.g., mechanical catches, sudden accelerations or decelerations). In some examples, the method of monitoring the health of an orbital shaker by analyzing video of rotation shafts includes applying visual identifiers to at least one drive shaft and at least one idler shaft of the orbital shaker. In some examples, ideal, "healthy" shakers have little to no rotational offset between driver and idler shafts. In contrast, in some examples, stalling shakers have large idler-to-driver angular offsets. Accordingly, in some examples, the method of monitoring the health of an orbital shaker may include decommissioning shakers once a threshold angular offset is satisfied.

In some examples, a method of monitoring the health of a shaker by analyzing accelerometer data includes: measuring, by an accelerometer, an orbital acceleration of the shaker; and identifying peaks within the acceleration data. Accelerometer data is a direct measure of the rotation of orbital shakers. Accordingly, accelerometer data indicates whether shaker motion is within specifications. In some examples, the method of monitoring the health of a shaker includes identifying high-frequency noise and/or acceleration peaks within time series data of total acceleration. Acceleration peaks indicate that the shaker is susceptible to stalling at the observed rotation speed. Acceleration peaks may be at least 2×, at least 4×, at least 6×, at least 8×, at least 10×, and/or the like greater than an expected acceleration of the shaker. Furthermore, in some examples, the method of monitoring the health of a shaker includes comparing a 2-dimensional histogram of the acceleration vectors of the tested shaker with a 2-dimensional histogram of the acceleration vectors of an ideal shaker. In some examples, the method of monitoring the health of a shaker includes decommissioning the shaker once a threshold number of acceleration peaks are detected. In some examples, the method of monitoring the health of a shaker includes decommissioning the shaker once a threshold acceleration value is reached.

Technical solutions are disclosed herein for monitoring the health of an orbital shaker. Specifically, the disclosed system/method addresses a technical problem tied to orbital shaker technology and arising in the realm of orbital shaker, namely the technical problem of how to detect anomalies in orbital shaker function before failure, such that expensive and/or irreplaceable experiments are not ruined by shaker failure. The system and method disclosed herein provides an improved solution to this technical problem by monitoring orbital shaker health, such that a user is notified of potential shaker failure before failure occurs.

The disclosed systems and methods provide an integrated practical application of the principles discussed herein. Specifically, the disclosed systems and methods describe a specific manner of monitoring shaker health, which provides a specific improvement over prior systems and results in improved experimental consistency, as shakers may be decommissioned and/or repaired before wear causes shaker failure or inconsistency in shaker motion. Furthermore, the disclosed systems and methods utilize an orbital shaker system, such that the orbital shaker system is integral to the systems and methods of monitoring shaker health. Accordingly, the disclosed systems and methods apply the relevant principles in a meaningfully limited way.

Aspects of systems and methods for monitoring orbital shaker health may be embodied as a computer method, computer system, or computer program product. Accordingly, aspects of the systems and methods for monitoring orbital shaker health may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the systems and methods for monitoring orbital shaker health may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of systems and methods for monitoring orbital shaker health may be written in one or any combination of programming languages, including an object-oriented programming language (such as Java, C++), conventional procedural programming languages (such as C), and functional programming languages (such as Haskell). Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the systems and methods for monitoring orbital shaker health may be described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be programmed into or otherwise provided to processing logic (e.g., a processor of a general purpose computer, special purpose computer, field programmable gate array (FPGA), or other programmable data processing apparatus) to produce a machine, such that the (e.g., machine-readable) instructions, which execute via the processing logic, create means for implementing the functions/acts specified in the flowchart and/or block diagram block(s).

Additionally or alternatively, these computer program instructions may be stored in a computer-readable medium that can direct processing logic and/or any other suitable device to function in a particular manner, such that the instructions stored in the computer-readable medium produce an article of manufacture including instructions which implement the function/act specified in the flowchart and/or block diagram block(s).

The computer program instructions can also be loaded onto processing logic and/or any other suitable device to cause a series of operational steps to be performed on the device to produce a computer-implemented process such that the executed instructions provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the systems and methods for monitoring orbital shaker health. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of illustrative systems and methods for monitoring shaker health. The examples in these sections are intended for illustration and should not be interpreted as limiting the scope of the present disclosure. Each section may include one or more distinct embodiments or examples, and/or contextual or related information, function, and/or structure.

A. First Illustrative Shaker

As shown in FIG. 1, this section describes an illustrative shaker 100. Shaker 100 is an example of orbital shakers suitable for use with methods or monitoring orbital shaker health, such as those described above.

As depicted in FIG. 1, shaker 100 includes a plate, nest, or tray 102 operatively coupled to a rotor 112 configured to rotate tray 102. Rotor 112 is driven by a motor 114, which collectively define a drive mechanism 110 powered by motor controller 130.

Tray 102 is configured to receive one or more sample vessels containing substances to be mixed by shaker 100. Tray 102 may be configured to receive any suitable sample vessels, such as plates including multiple wells, test tubes, vials, flasks, and/or the like. In some examples, tray 102 is configured to receive a 96-well plate. In some examples, tray 102 is operatively coupled to a heater 104 configured to heat contents of the one or more sample vessels. In some examples, heater 104 may be integrated into tray 102, such that heater 104 and tray 102 are simultaneously rotated by rotor 112. In these examples, tray 102 may be additionally and/or alternatively be referred to as a heater plate. In some examples, tray 102 defines one or more apertures through which magnets 106 may be extended (i.e., during a method of magnetically separating a mixture). In some examples, magnets 106 may be configured to retract during shaker rotation, such that magnets 106 are spaced apart from a bottom surface of tray 102 during shaker rotation.

Drive mechanism 110 comprises any suitable mechanism configured to induce circular motion in tray 102, such as a belt drive, crank drive, lead screw, gears, and/or the like. While drive mechanism 110 is configured to induce circular motion in tray 102, in some examples, drive mechanism 110 provides greater control over an orbit of tray 102, providing an ability to closely control shaking and therefore mixing of samples. This can include inducing non-circular motions such as elliptical, linear, eccentric, or even random motions of the tray. Drive mechanism includes rotor 112 coupled to a motor 114. Rotor 112 may comprise any suitable mechanism configured to induce circular motion in tray 102, such as a drive shaft, wheel, gear, crank, and/or the like. In some examples, rotor 112 comprises a drive shaft 120 coupled to tray 102 at a first end and operatively coupled to a motor 114 by a belt 116 at a second end.

Belt 116 may comprise any suitable belt, such as a toothed belt, a flat belt, a V-belt, a timing belt, and/or the like. In some examples, shaker 100 includes one or more pullies and/or tensioners disposed along belt 116 between motor and drive shaft 120. In some examples, rotor 112 comprises a triple eccentric drive, having a single drive shaft 120 coupled to motor 114 and two idler shafts 118 coupled to tray 102. In other words, torque applied to drive shaft 120 by motor 114 is transmitted to the two idler shafts 118 by tray 102. In some examples, rotor 112 comprises two or more drive shafts 120 coupled to motor 114 and a single idler shaft 118. In these examples, angular offsets between shafts may be reduced. In some examples, rotor 112 comprises three drive shafts 120, which may overcome points in the orbital rotation that require high amounts of torque due to differences in the relative position of eccentricity on the drive shaft(s) compared to the position of the eccentricity on the idler shaft(s).

Shafts 120, 118 of rotor 112 may have any suitable arrangement, such as an equilateral triangle, isosceles triangle, a scalene triangle, and/or the like. In the example depicted in FIG. 7, shafts 432, 434, and 436 are arranged in a substantially isosceles triangle, with longer legs extending between idler shafts 434, 436 and drive shaft 432 and a shorter leg extending between the two idler shafts 434, 436. However, through geometric reasoning, twice every rotation, the drive shaft will experience a point where it can transmit no torque to an idler shaft, namely when the angle of the offset shaft is equal to the line connecting the driver shaft and the idler shaft in question (i.e., the side of the triangle). Such a condition may be called a zero torque transfer condition. For an equilateral triangle, only a single idler shaft may be in a zero torque transfer condition at one time. However, for triangular arrangements where the two idler shafts are on the shorter side of an isosceles triangle, in some instances, both idler shafts may be relatively close to a zero torque transfer condition. When both idler shafts are close to a zero torque transfer condition, mechanical slop is introduced into the system, causing the idler shafts to become out of sync with the drive shaft. Accordingly, non-equilateral arrangements of shafts may be more prone to motor stalling conditions than equilateral arrangements of shafts. However, in some examples, rotor 112 includes any suitable number of shafts, such as one shaft, two shafts, three shafts, four shafts, five shafts, six shafts, and/or the like, in an equilateral arrangement or in any other desired arrangement.

Motor 114 may comprise any suitable drive mechanism, such as an electric motor, brushless DC motor, stepper motor, DC servo motor, and/or the like. In some examples, motor 114 comprises a stepper motor. In some examples, stepper motors require constant applied current, resulting in the motor generating significant amounts of heat to produce the required operation. In some examples, when motor 114 is a DC servo motor, the amount of heat generated to move the shaker in a desired manner is reduced. In some examples, motor 114 is configured to drive shaft 120 via belt 116. Motor 114 may have any suitable range of speeds in rotations per minute, such as between 500-1200 RPM, 700-1500 RPM, 600-1700 RPM, and/or the like. In some examples, motors having a greater range of speeds may be beneficial to enable additional laboratory applications.

Motor 114 is coupled to a motor controller 130, which is configured to send instructions to motor 114. While motor controller 130 is referred to as a motor controller, motor controller 130 may be suitable for controlling any and/or all components of shaker 100, such as heater 104, magnets 106, and/or the like. In some examples, motor controller 130 is integrated into shaker 100, such that a user may directly instruct shaker 100, e.g., via a user interface integrated into a housing of the shaker. In these examples, motor controller 130 may comprise an embodiment of programmable logic controller system 1600, described below in section H. In some examples, motor controller 130 comprises a computer, handheld device, mobile phone, and/or the like, which is configured to instruct the motor via network communication. In these examples, motor controller 130 may comprise an embodiment of data processing system 1400 or networked data processing system 1500, described below in sections F and G. In some examples, shaker 100 is a component of a larger laboratory system, comprising devices such as automated pipettors, incubators, and/or the like. In these examples, motor controller 130 may be integrated into an automated pipettor, incubator, control center, computer, and/or the like included within the larger laboratory system. In some examples, motor controller 130 is operatively coupled to a display 132. The display may comprise any suitable human-machine interface or other mechanism configured to display information to a user, e.g., a CRT, LED, or LCD monitor or screen, etc. Accordingly, in some examples, shaker 100 may be configured to display warnings, shaker health data, and/or error codes to a user based on data collected during methods 200, 300, 400, and 500.

Motor 114 is operatively coupled to a power supply 134 configured to power motor 114. Power supply 134 may comprise any suitable source of power, such as utility power, battery, and/or the like. In some examples, motor controller 130 and power supply 134 are operatively coupled to a power failure circuit 135 configured to detect whether a power fault has occurred within the shaker.

In some examples, shaker 100 comprises one or more sensors configured to provide information to motor controller 130. In some examples, shaker 100 comprises a camera 136 configured to record video of shafts 118, 120 during use (e.g., to provide data for use in method 300). In some examples, shaker 100 comprises an accelerometer 138 configured to record acceleration data during use (e.g., to provide data for use in method 400).

In some examples, shaker 100 comprises one or more indicators, such as a homing disc disposed on drive shaft 120 comprising a disc having a slot configured to allow passage of a light beam. In some examples, motor 114 is slowly stepped until the light beam passes through the slot, indicating a home condition for tray 102. In some examples, a pulse provided by the homing disc is detected as a function of time (e.g., by camera 136) to measure motor RPM and detect motor stall condition and track belt slipping.

B. First Illustrative Method

Figure 2:
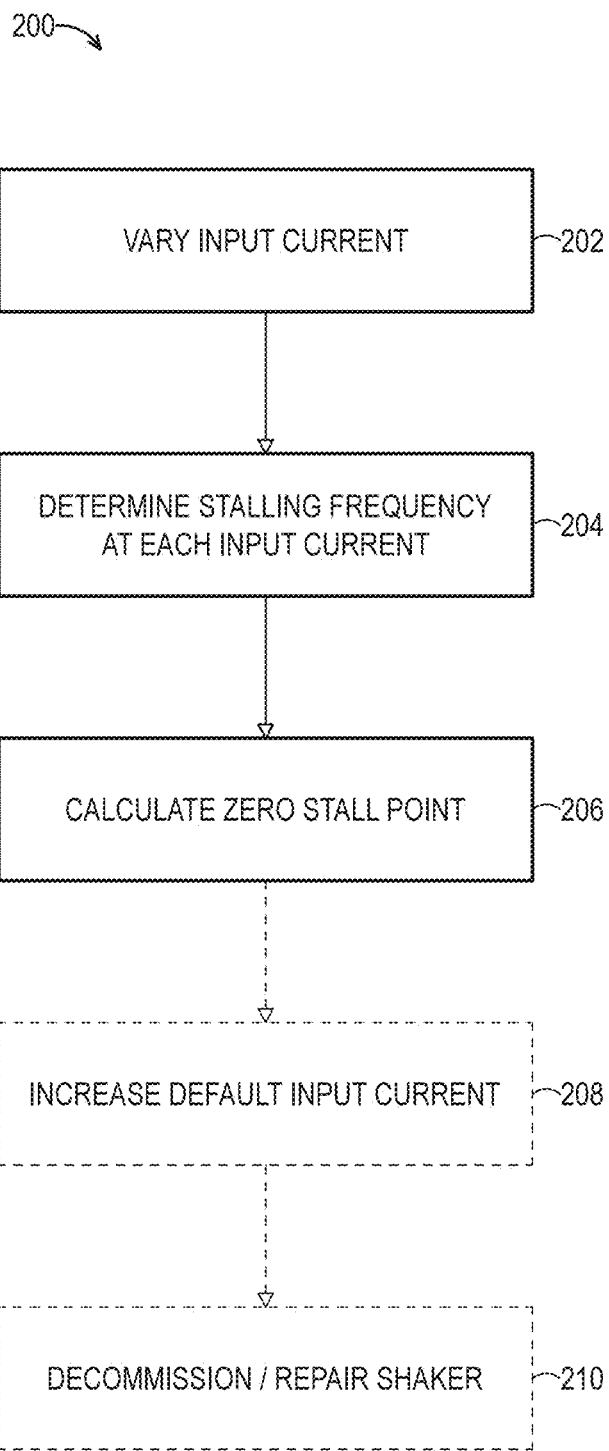
FIG. 2 is a flow chart depicting steps of a first illustrative method for monitoring the health of an orbital shaker according to the present teachings.

This section describes steps of an illustrative method 200 for monitoring the health of an orbital shaker; see FIG. 2. Aspects of illustrative shaker 100 may be utilized in the method steps described below. Where appropriate, reference may be made to components and systems that may be used in carrying out each step. These references are for illustration, and are not intended to limit the possible ways of carrying out any particular step of the method.

FIG. 2 is a flowchart illustrating steps performed in an illustrative method, and may not recite the complete process or all steps of the method. Although various steps of method 200 are described below and depicted in FIG. 2, the steps need not necessarily all be performed, and in some cases may be performed simultaneously or in a different order than the order shown.

Sufficient torque must be delivered to a rotor of an orbital shaker, such as orbital shaker 100, for the "tray" or "nest" of the shaker to rotate. The "tray" or "nest" is the portion of the shaker configured to retain a component to be mixed. The amount of torque required to rotate the tray depends on a number of factors, such as a drive mechanism or motor installed within the shaker, a load placed on the tray, an amount of wear experienced by the shaker due to use, and/or the like. Shaker wear depends on the design of the shaker, and can include (for example) drive belt wear, wear on bores configured to house shaker bearings, bearing wear, rotor wear, and/or the like. Each of the above types of wear may increase the amount of torque required to rotate the shaker during use. Accordingly, method 200 includes monitoring a torque required to rotate the tray of the shaker without the shaker experiencing stall conditions (AKA stalling). "Stalling" is defined as a lack of rotation when the motor or other drive mechanism is commanded to rotate the shaker. In other words, as a shaker experiences wear, the shaker is susceptible to stalling at increasingly high torque levels. In some examples, the torque required to reliably rotate the shaker tray (e.g., without the shaker stalling) may exceed a default torque provided by the drive mechanism, resulting in shaker failure. As laboratory assays utilizing shakers are often expensive and/or utilize limited testing material, failure during use may result in high costs to the user or loss of irreplaceable data. Monitoring the orbital shaker according to method 200 may allow a user to discontinue use of the shaker before shaker failure, preventing costly failures of the shakers while in use.

Step 202 of method 200 includes varying an input current applied to the motor (AKA drive mechanism) of an orbital shaker, such as shaker 100. Input current applied to the motor is proportional to torque delivered to a rotor in orbital shakers according to the present teachings. Accordingly, varying the input current varies the torque applied to the rotor. In some examples, varying an input current applied to the motor includes selecting current values suitable for use with the orbital shaker, such as shaker 100. In some examples, the current values are selected based on the drive mechanism, power supply, torque requirements of the shaker, and/or the like. In some examples, the selected current values are selected such that at least one current value is greater than a default current applied to the drive motor, and such that at least one current value is less than the default current applied to the drive motor. In some examples, the selected current values are between 0% and 100% of the maximum current of the orbital shaker. In some examples, the selected current values are evenly distributed between 0% and 100% of the maximum current of the orbital shaker.

In some examples, varying an input current applied to the motor includes performing multiple tests at each input current. In some examples, each test may include operating the orbital shaker for a time interval greater than an acceleration time of the motor, as the motor speed increases during the acceleration time and is constant after the acceleration time. Accordingly, in some examples, varying an input current applied to the motor is configured to determine whether the motor will stall before reaching a maximum speed of the motor. In some examples, an acceleration time of the motor may be between 1 and 10 seconds, between 2 and 5 seconds, approximately 3 seconds, and/or the like. Accordingly, in some examples, the test time interval may be greater than the acceleration time, such as greater than 5 seconds, greater than 10 seconds, greater than 20 seconds, greater than 50 seconds, greater than 100 seconds, and/or the like. In some examples, the test time interval may be greater than a maximum stalling time of the motor. In other words, in some examples, the test time interval may be greater than a latest observed stalling time of the orbital shaker. Accordingly, in some examples, the test time interval is greater than 10 seconds, greater than 20 seconds, greater than 50 seconds, greater than 100 seconds, and/or the like. In some examples, varying the input current applied to the drive mechanism includes running at least one test at each input current, at least five tests at each input current, at least ten tests at each input current, at least 50 tests at each input current, at least 100 tests at each input current, and/or the like.

Step 204 of method 200 includes determining a stalling frequency at each input current. In some examples, determining a stalling frequency at each input current includes counting a number of stalling events at each input current. In some examples, counting a number of stalling events at each input current includes assigning an attempt a "0" if the motor stalls before reaching a maximum motor speed and assigning an attempt a "1" if the motor reaches the maximum motor speed. In some examples, determining a stalling frequency at each input current includes dividing the counted number of stalling events by the number of tests to provide a fraction of successful events. In some examples, determining a stalling frequency at each input current includes taking the inverse of the fraction of successful events to provide the stalling frequency.

Figure 3:
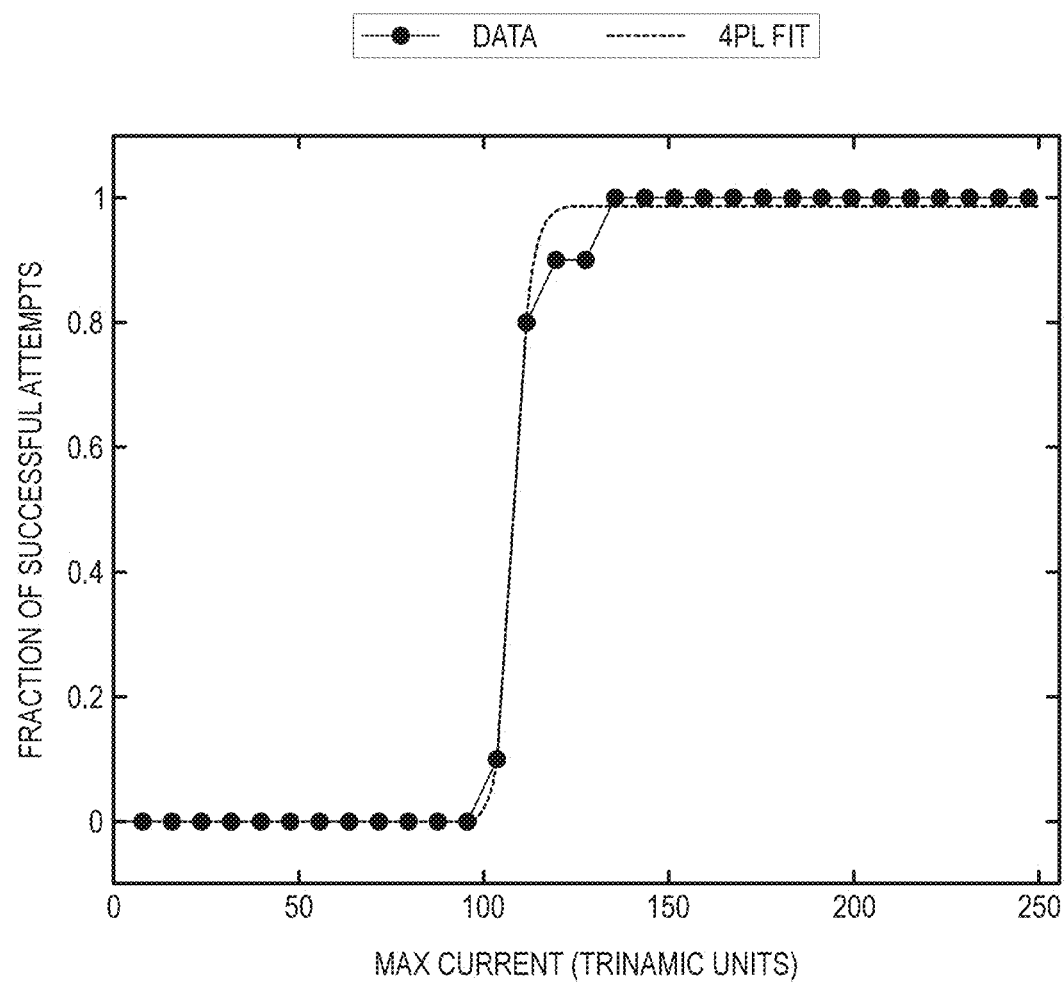
FIG. 3 is a graph depicting a frequency of stalling events at different current inputs.

Step 206 of method 200 includes calculating an input current above which the stalling frequency is always zero (AKA the zero stall point). In some examples, calculating an input current above which the stalling frequency is always zero includes generating a "stalling curve" relating the input current to the determined stalling frequency. FIG. 3 depicts an illustrative "stalling curve." A fraction of successful attempts is plotted at each input current. As can be seen from FIG. 3, data collected during step 204 produces a sigmoidal curve. From stalling curves, such as the stalling curve depicted in FIG. 3, the input current above which the stalling frequency (i.e., the inverse of the fraction of successful attempts) is always zero can be determined. In FIG. 3, a four-parameter logistic (i.e., 4PL) curve is fit to the stalling curve. In some examples, the four-parameter logistic curve may be utilized to calculate the input current above which the stalling frequency is always zero. However, in some examples, the input current above which the stalling frequency is always zero is determined by selecting the lowest tested input current above which the stalling frequency is zero. For example, in the example depicted in FIG. 3, the input current above which the stalling frequency is always zero is approximately 140 trinamic units (1.172 A).

When a shaker has experienced a high amount of use and has experienced normal wear and tear, the torque requirement may increase. As the torque required to achieve rotation of the shaker tray increases, the input current above which the stalling frequency is always zero increases. Accordingly, the input current above which the stalling frequency is always zero is a metric of shaker health. If the input current above which the stalling frequency is always zero is significantly lower than the "default" or "operational" current of the shaker, then the shaker is considered to be "healthy". For example, in some examples, shakers having an input current above which the stalling frequency is always zero of approximately 25% of a maximum current of the shaker are considered to be healthy. If the input current above which the stalling frequency is always zero is elevated and close to the default current (e.g., greater than 50% of a maximum current of the shaker), the shaker is considered to be "unhealthy". If the input current above which the stalling frequency is always zero is higher than the default current, the shaker is considered to be "failing". This technology facilitates screening shaker assemblies during the manufacturing process and after deployment in the field, and provides an early warning system for shakers that are close to failure. As the input current above which the stalling frequency is always zero approaches some threshold value (e.g., the default current delivered to the motor), the shaker would be identified as approaching end-of-life and could be replaced or repaired to avoid a costly failure while in use.

Step 208 of method 200 optionally includes increasing the default input current of the orbital shaker such that the default input current of the orbital shaker is greater than the input current above which the stalling frequency is always zero. Accordingly, as the torque requirements of the shaker increase, the default input current may increase. In some examples, step 208 of method 200 includes automatically, by a motor controller of the orbital shaker, such as motor controller 130 of orbital shaker 100, increasing the default input current of the orbital shaker such that the default input current of the orbital shaker is greater than the input current above which the stalling frequency is always zero.

Step 210 of method 200 optionally includes decommissioning and/or repairing the orbital shaker when the input current satisfies a threshold value. In some examples, step 210 of method 200 includes decommissioning and/or repairing the orbital shaker when the input current above which the stalling frequency is always zero is higher than a maximum input current of the orbital shaker. In some examples, repairing the orbital shaker includes adjusting a drive belt tension of the shaker, replacing motor components, and/or the like. In some examples, step 210 of method 200 includes decommissioning and/or repairing the orbital shaker if the input current above which the stalling frequency of the drive motor is zero is greater than a default input current of the orbital shaker. In some examples, step 210 of method 200 includes decommissioning and/or repairing the orbital shaker if the input current above which the stalling frequency of the drive motor is zero is within a selected interval of a default input current of the orbital shaker, such as within 2%, within 5%, within 10%, within 20% and/or the like of the default input current of the orbital shaker. In some examples, step 210 of method 200 includes decommissioning and/or repairing the orbital shaker if the input current above which the stalling frequency of the drive motor is zero is greater than a selected percentage of the maximum current, such as greater than 50%, greater than 75%, greater than 80%, greater than 90%, and/or the like. In some examples, step 210 of method 200 includes displaying, to a user, an error code notifying the user that the input current satisfies the threshold value.

C. Second Illustrative Method

Figure 4:
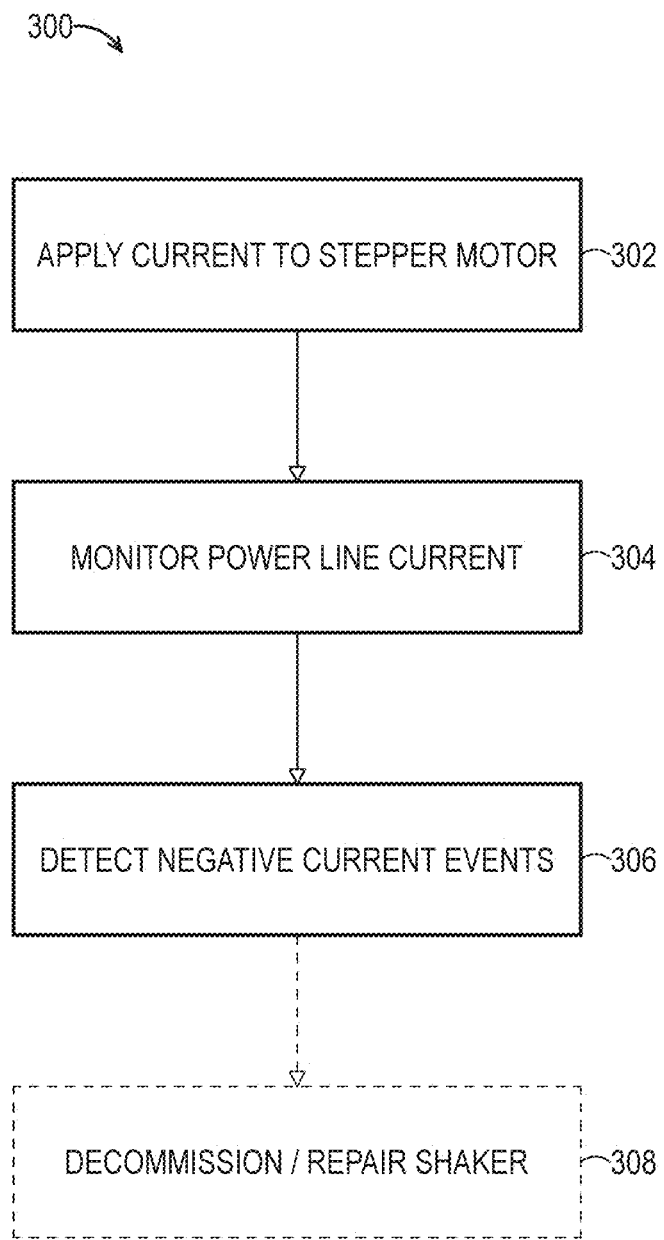
FIG. 4 is a flow chart depicting steps of a second illustrative method for monitoring the health of an orbital shaker according to the present teachings.

This section describes steps of an illustrative method 300 for monitoring the health of an orbital shaker; see FIG. 4. Aspects of illustrative shaker 100 may be utilized in the method steps described below. Where appropriate, reference may be made to components and systems that may be used in carrying out each step. These references are for illustration, and are not intended to limit the possible ways of carrying out any particular step of the method.

FIG. 4 is a flowchart illustrating steps performed in an illustrative method, and may not recite the complete process or all steps of the method. Although various steps of method 300 are described below and depicted in FIG. 4, the steps need not necessarily all be performed, and in some cases may be performed simultaneously or in a different order than the order shown.

Sufficient torque must be delivered to a rotor of an orbital shaker, such as orbital shaker 100, for the "tray" or "nest" of the shaker to rotate. In some examples, orbital shakers according to the present teachings, such as orbital shaker 100 utilize electric motors, such as stepper motors, to produce torque. As a result, back electromotive force (back EMF) is generated during motor, and consequently, shaker operation. A rotating stepper motor generates back EMF at a constant rate as fields of magnetic poles generated by the stepper motor pass over phase windings within the stepper motor. Back EMF is a voltage that acts against the supply voltage of the motor, that in-turn reduces the rise time of the phase current of the motor. This is well characterized: a steady state motor will generate back EMF at a constant magnitude relative to motor input EMF. In other words, back EMF is proportional to a rotational speed of the motor.

However, sudden accelerations or decelerations in rotation caused by a mechanical hitch or catch in shaker rotation result in an inequality between motor input and back EMF, applying negative current to a power line supplying the motor. This negative current is created when the back EMF is greater than the power supplied to the motor during rotation. Back EMF is generated when a mechanical catch in the rotation causes a sudden change in motor speed. This fluctuation in speed creates an inequality between back EMF and motor input. If the hitch is sufficiently large, that inequality creates negative current conditions, which are reflected within the system as power faults.

The present method of monitoring the health of an orbital shaker detects negative current events resulting from mechanical hitches or resistances within shaker rotation. Accordingly, the present method of monitoring the health of an orbital shaker assesses the smoothness of shaker rotation. Monitoring the power faults that a system creates during use provides direct understanding both about rotation performed by trays of the orbital shaker and about any asymmetrical resistance encountered during rotation. For example, a large number of negative current events and, accordingly, a large number of hitches in the system indicate that the motor may be underpowered (e.g., that adequate torque is not being provided to the motor). In contrast, if there are few or no negative current events and, accordingly, few or no hitches, the motor is adequately powered. Accordingly, a number of negative current events is a good indication of the motor's capability to power the specific mechanical configuration of a given shaker unit.

Step 302 of method 300 includes applying an input current to an electric motor, such as a stepper motor, of the orbital shaker. While orbital shakers, such as orbital shaker 100, may include a variety of motors and/or drive mechanisms, method 300 utilizes back electromotive force generated during electric motor function to monitor the health of the orbital shaker. Accordingly, applying the input current to the electric motor causes the stepper motor to rotate, powering the orbital shaker and, accordingly, generating back EMF.

Step 304 of method 300 includes monitoring an operational current of the power line of the orbital shaker. In some examples, monitoring an operational current of the power line includes plotting the operational current of the power line and a ground current of a ground line. In some examples, monitoring an operational current of the power line includes monitoring a voltage of a power fault circuit configured to detect a presence of the orbital shaker. In some examples, the power fault circuit may be configured to detect events when a voltage of the power line drops below zero.

Step 306 of method 300 includes detecting negative current events within the power line. In some examples, detecting negative current events within the power line includes detecting decreases in the voltage of the power fault circuit, also referred to as power faults. In some examples, detecting negative current events within the power line includes detecting when the operational current drops below the ground current.

Figure 5:
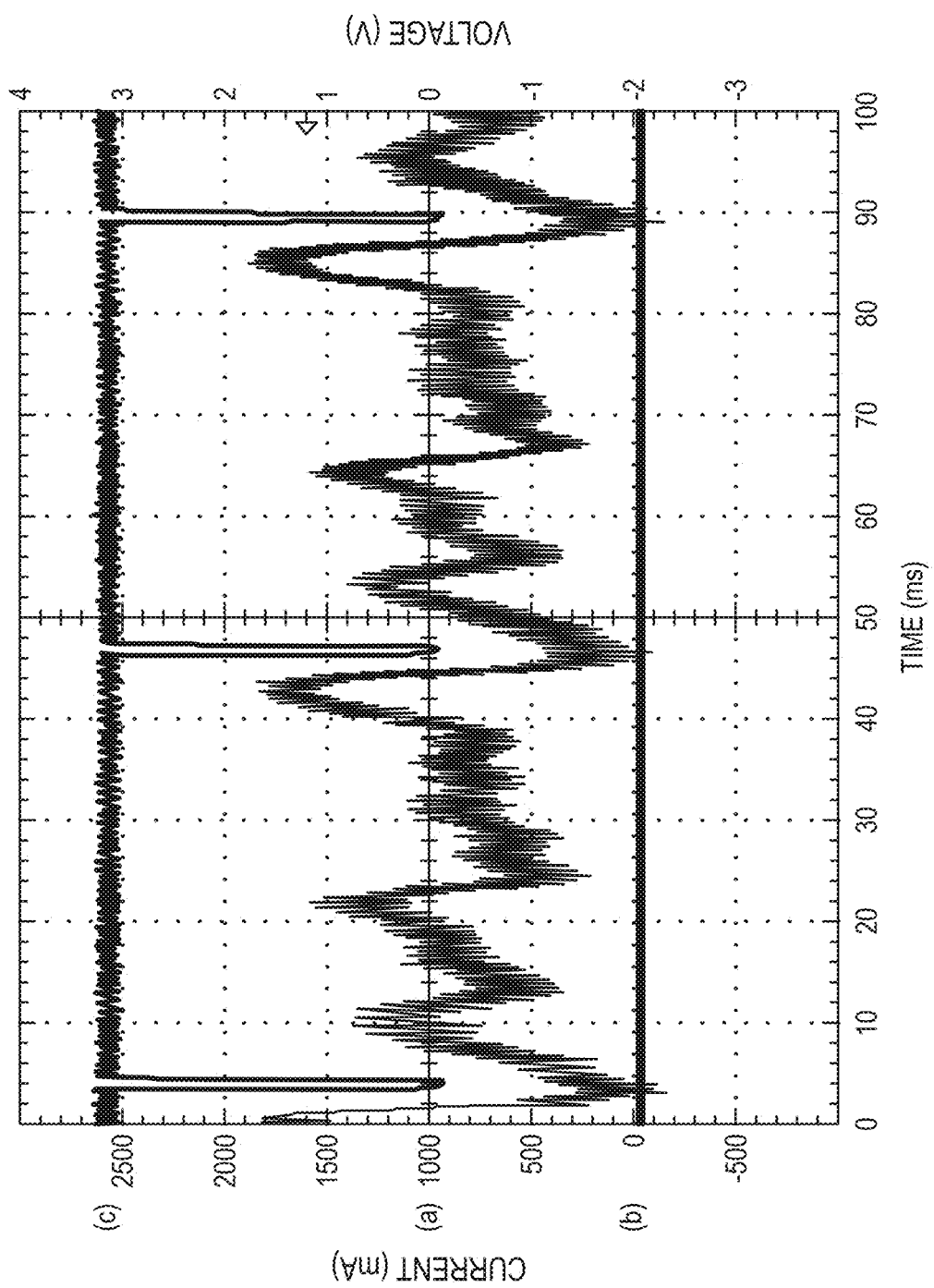
FIG. 5 is a graph depicting (a) a current of a power line of the shaker, (b) a current of a ground line of the shaker, and (c) a voltage of a power fault line of the shaker plotted over time.

These examples are both depicted in FIG. 5, which depicts (a) a current of a power line of the shaker, (b) a current of a ground line of the shaker, and (c) a voltage of a power fault line of the shaker plotted over time. As can be seen in FIG. 5, during shaker operation, line (a) may drop below line (b). As line (a) drops below line (b), line (c) drops from a steady state voltage to a local minimum. Accordingly, decreases in the voltage of the power fault circuit are correlated with instances where the power line current drops below the ground current. Accordingly, detecting negative current events within the power line of the orbital shaker includes either and/or both of detecting when the operational current drops below the ground current and detecting decreases in the voltage of the power fault circuit.

In some examples, detecting negative current events within the power line includes recording each instance where the voltage of the power fault circuit decreases. As described above, these instances correlate with negative power conditions within the system due to back EMF. These negative current events correlate with future lifetime of orbital shaker units. Orbital shaker units that record higher numbers of power faults are observed to stall more frequently than orbital shaker units having fewer logged power faults.

In some examples, step 308 of method 300 optionally includes decommissioning and/or repairing the orbital shaker when a number of detected power faults per week of operation, a total number of detected negative current events, and/or the like satisfies a threshold value. In some examples, step 308 of method 300 includes increasing the input current in response to the number of detected power faults per week of operation and/or the number of detected negative current events satisfying the threshold value. In some examples, a frequency of detected power faults increases as the orbital shaker ages and/or deteriorates. For example, an adequately powered shaker may have, for example, 2000 detected power faults over a time interval of multiple years (e.g., 1 year, 2 years, 5 years, and/or the like) of operation, while, in contrast, a stalling shaker may have 2000 detected power faults during a week of operation. Accordingly, in some examples, step 308 of method 300 includes decommissioning and/or repairing the orbital shaker when a number of detected power faults per week of operation reaches 500, 750, 1000, 2000, 5000, and/or the like. In some examples, step 308 of method 300 includes decommissioning and/or repairing the orbital shaker when a total number of detected power faults reaches 500, 750, 1000, 2000, 5000, 10000, and/or the like. In some examples, step 308 of method 300 optionally includes decommissioning the shaker in response to detected negative current events. In some examples, step 308 of method 800 optionally includes performing maintenance on the shaker in response to detected negative current events. In some examples, step 310 of method 300 includes displaying, to a user, an error code notifying the user that the number of detected current events satisfies the threshold value.

D. Third Illustrative Method

Figure 6:
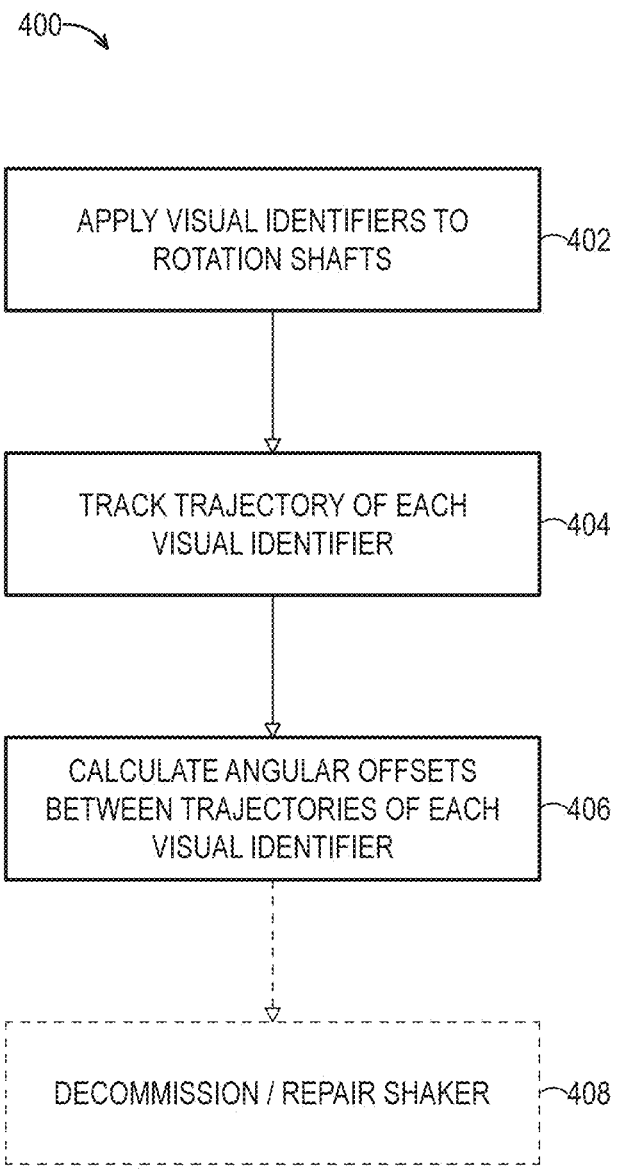
FIG. 6 is a flow chart depicting steps of a third illustrative method for monitoring the health of an orbital shaker according to the present teachings.

This section describes steps of an illustrative method 400 for monitoring the health of an orbital shaker; see FIG. 6. Aspects of illustrative shaker 100 may be utilized in the method steps described below. Where appropriate, reference may be made to components and systems that may be used in carrying out each step. These references are for illustration, and are not intended to limit the possible ways of carrying out any particular step of the method.

FIG. 6 is a flowchart illustrating steps performed in an illustrative method, and may not recite the complete process or all steps of the method. Although various steps of method 400 are described below and depicted in FIG. 6, the steps need not necessarily all be performed, and in some cases may be performed simultaneously or in a different order than the order shown.

In some examples, orbital shakers in accordance with the present teachings include triple eccentric drive mechanisms, including a single drive shaft coupled to a motor by a belt, and a pair of idler shafts, which follow the drive shaft due to forces transmitted through a tray of the orbital shaker. Accordingly, in some examples, a method of monitoring the health of an orbital shaker includes detecting any lag between drive and idler shafts included within the orbital shaker as an assessment of secondary motion such as mechanical catches, sudden accelerations, and/or decelerations during shaker operation. Video analysis facilitates direct observation of rotational patterns in the shaker. In certain orbital shakers, "healthy" shakers can be distinguished from "unhealthy" shakers because ideal, "healthy" shakers have little to no rotational offset between driver and idler shafts. In contrast, in some examples, stalling shakers have large idler-to-driver angular offsets. In these examples, a wider spread in rotational offsets and higher angular acceleration peaks correlate with stalling shakers.

Figure 7:
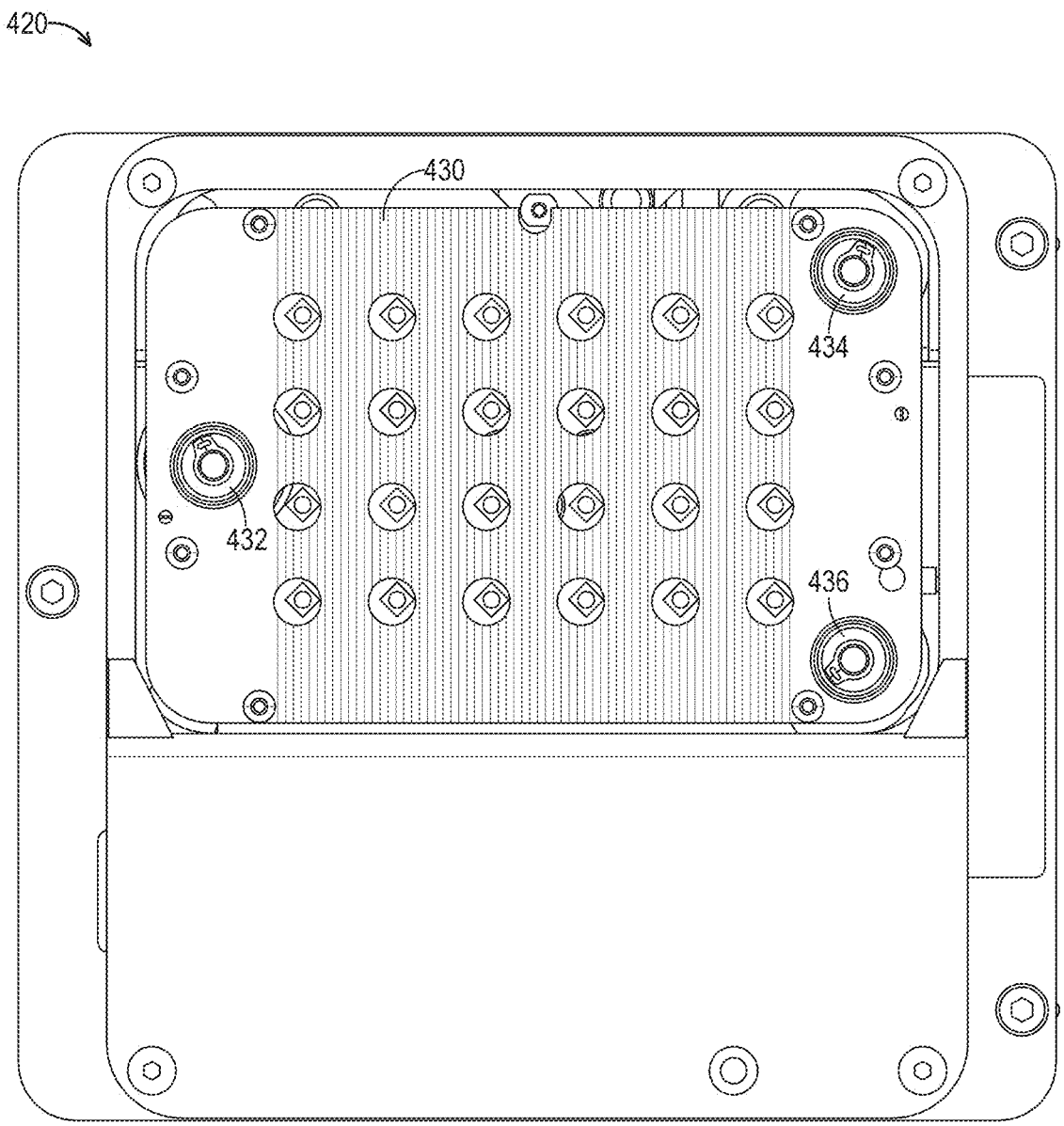
FIG. 7 is a top plan view of an illustrative shaker suitable for use with the method of FIG. 6.

Step 402 of method 400 includes applying visual identifiers to at least one drive shaft and at least one idler shaft of an orbital shaker. In some examples, as described above with respect to shaker 100, a rotor of the orbital shaker comprises a triple eccentric drive, comprising a single drive shaft coupled to both a tray and a motor of the orbital shaker and a pair of idler shafts coupled to the tray of the orbital shaker. Accordingly, in some examples, step 402 includes applying visual identifiers to top surfaces of the drive shaft and at least one idler shaft of the pair of idler shafts. In some examples, step 402 includes applying visual identifiers to each shaft involved in rotation of the orbital shaker. The visual identifiers may comprise any suitable visual identifiers which distinguish the shafts from each other, such as colored dials, light emitting diodes (LEDs), fluorescent tags, and/or the like. Accordingly, in some examples, each shaft may be identified by a different color, shape, and/or size of visual identifier. FIG. 7 depicts a top view of an illustrative shaker 420 including a shaker tray 430 to which a drive shaft 432 and two idler shafts 434, 436 (AKA edge idler shaft 434, fan idler shaft 436) are operatively coupled. Accordingly, step 402 of method 400 includes applying visual identifiers to drive shaft 432 and idler shafts 434, 436, such that the shaft positions may be tracked during use.

Step 404 of method 400 includes tracking rotational positions of each visual identifier. Accordingly, in some examples, method 400 includes operating the shaker, such that the drive shafts and two idler shafts rotate. The shaker may be operated at any suitable speed, such as 750 RPM, 1000 RPM, 1200 RPM, 1500 RPM, and/or the like. In some examples, tracking rotational positions of each visual identifier includes utilizing a camera to record video of each visual identifier. As shakers tend to rotate at relatively high speeds, in some examples, the camera records video at a frame rate suitably fast to detect shaker motion (e.g., using a high speed video camera). Accordingly, in some examples, the camera records at a frame rate of at least 20 fps, at least 30 fps, at least 45 fps, and/or the like. In some examples, the camera records video at a frequency close to the shaker rotation rate. For example, a camera recording a shaker operating at 1500 RPM may record video at approximately 25 fps.

In some examples, tracking rotational positions of each visual identifier further comprises performing image processing on the video, such that rotational positions of the at least one idler shaft may be tracked relative to the driver shaft. In some examples, tracking rotational positions of each visual identifier includes performing image analysis to create image masks of each frame of the video. Performing image processing on the video may include using Python, MATLAB, TensorFlow, GIMP, and/or the like.

Step 406 of method 400 includes calculating angular offsets between trajectories of each visual identifier. In some examples, calculating angular offsets between trajectories of each visual identifier includes calculating a best fit ellipse overlaying image masks of the video created at step 404. Relative angles of each idler shaft relative to the drive shaft can then be calculated.

Figure 8:
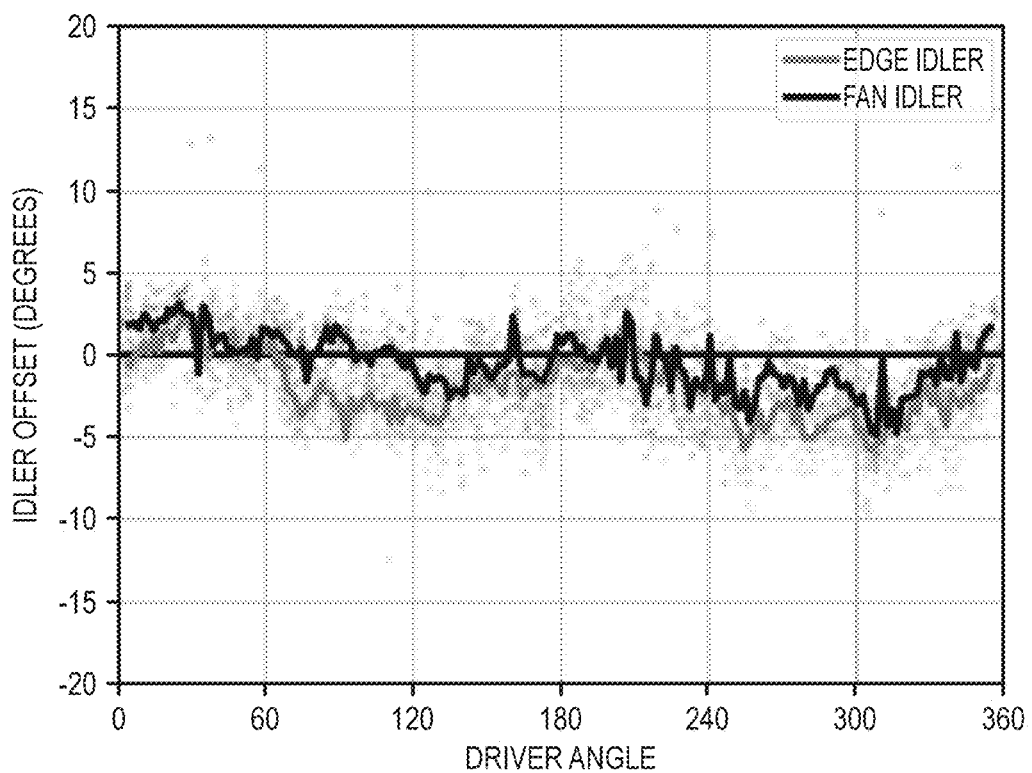
FIG. 8 is a graph depicting an average of angular offsets of a first and second idler shaft compared to a driver shaft in an ideal shaker.
Figure 9:
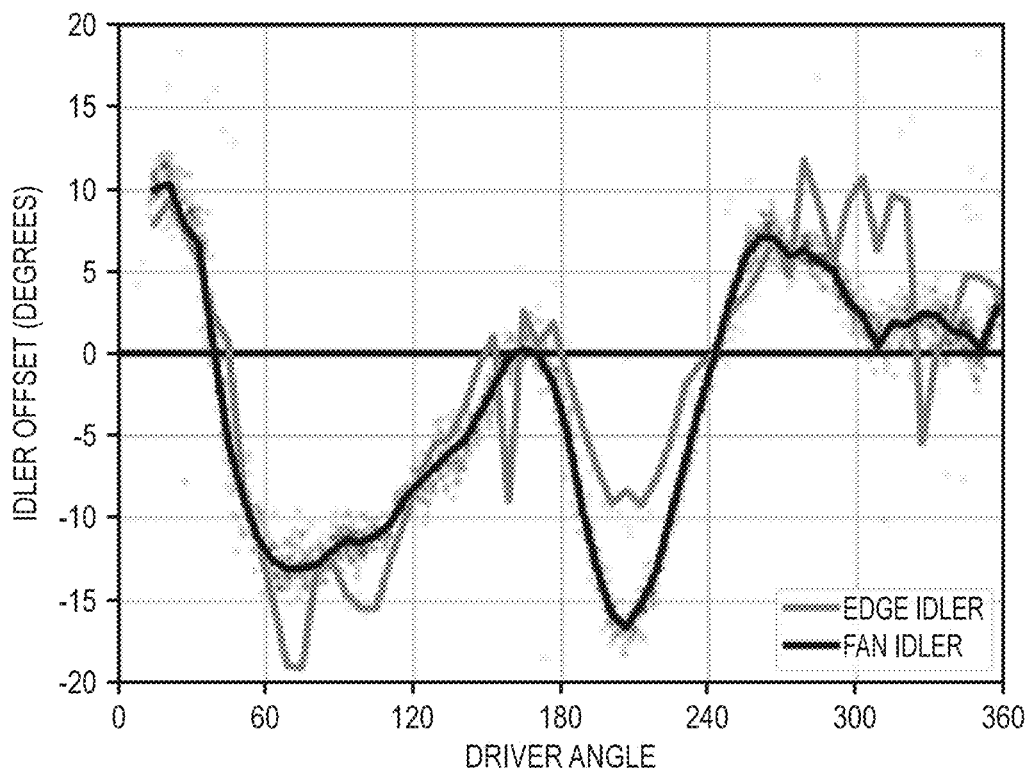
FIG. 9 is a graph depicting an average of angular offsets of a first and second idler shaft compared to a driver shaft in a stalling shaker.

FIGS. 8 and 9 represent the relative difference in angular offsets over the average motion of one complete driver rotation after observing greater than 3000 rotations. Due to the high speed of the shakers, in some examples, data is not chronologically collected at step 404. Instead, video analysis performed at step 406 exploits the repeating nature of the orbit of the shafts, utilizing the rotational position of the driver as a reference for the relative positions of the idler shafts. FIGS. 8 and 9 both plot the angular offset in degrees of first and second idler shafts, referred to here as edge idler and fan idler, against the rotational position of the driver. FIG. 8 represents the angular offset of the first and second idler shafts in an ideal shaker, having low to zero angular offset. In contrast, FIG. 9 represents the angular offset of the first and second idler shafts in a stalling shaker, having significantly higher angular offsets.

Figure 10:
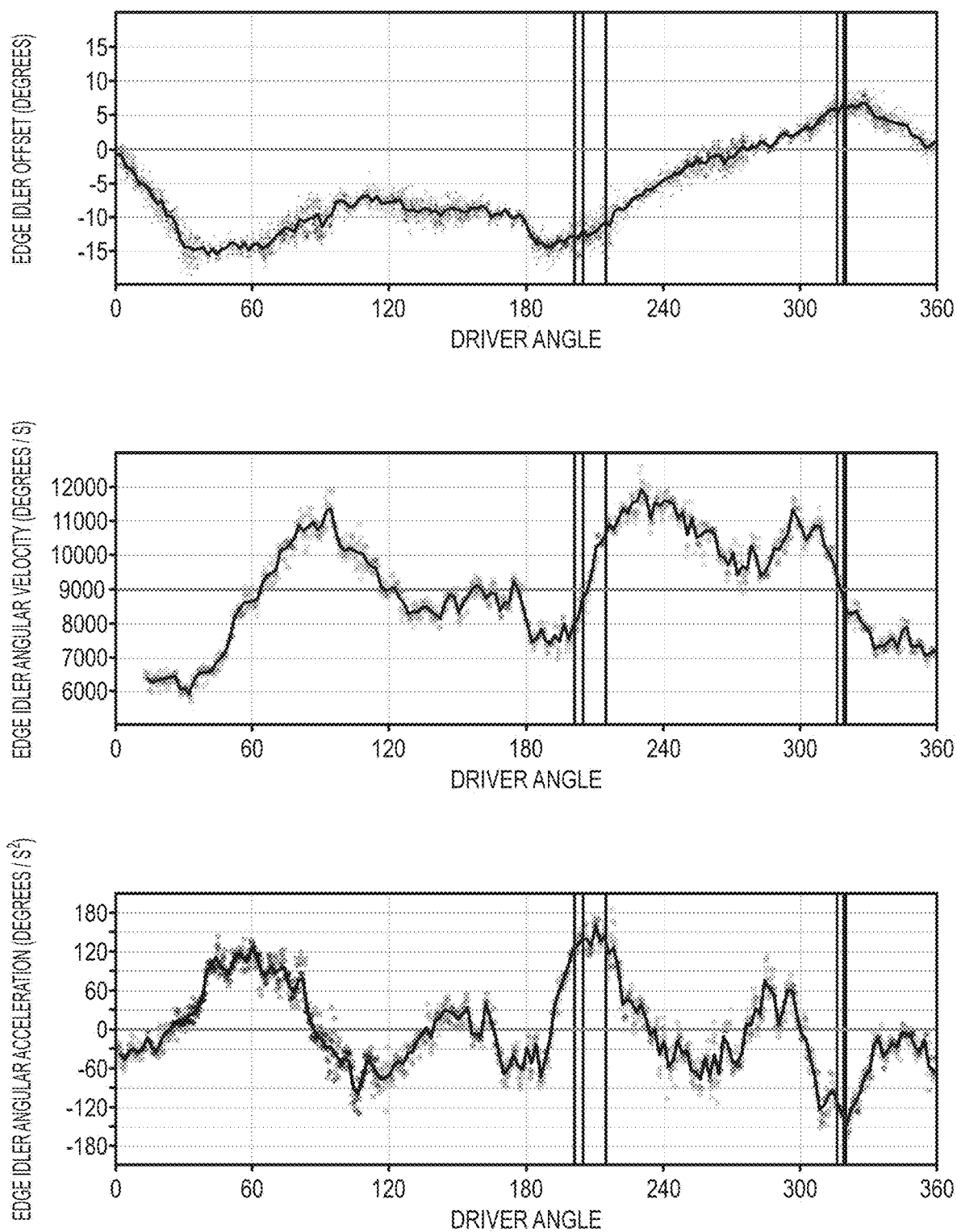
FIG. 10 is a graph depicting the angular offset, angular velocity, and angular acceleration of a first idler shaft correlated with stalling events.

Angular acceleration data collected via method 400 may be further processed to determine stalling locations. FIG. 10 depicts, from top to bottom, the angular offset of a first idler shaft (degrees), the angular velocity of the first idler shaft (degrees/s), and the angular acceleration of the first idler shaft (degrees/s$^2$). Stalling events are plotted as vertical lines. As depicted in FIG. 10, stalling occurs in repeatable locations corresponding to peaks within the angular acceleration data.

In some examples, step 408 of method 400 optionally includes repairing the orbital shaker in response to high angular offsets. In some examples, step 408 of method 400 includes repairing the orbital shaker in response to angular offsets of the idler shafts satisfying a threshold angular offset. In some examples, step 408 of method 400 include repairing the orbital shaker in response to angular offsets of the idler shafts exceeding 5 degrees, 8 degrees, 10 degrees, 15 degrees, and/or the like. In some examples, step 408 of method 400 optionally includes decommissioning the shaker in response to high angular offsets, such as when the angular offsets satisfy a threshold angular offset. In some examples, step 408 of method 400 optionally includes performing maintenance on the shaker in response to response to high angular offsets, such as when the angular offsets satisfy a threshold angular offset. In some examples, step 408 of method 400 includes displaying, to a user, an error code notifying the user that the angular offset satisfies the threshold angular offset.

E. Fourth Illustrative Method

Figure 11:
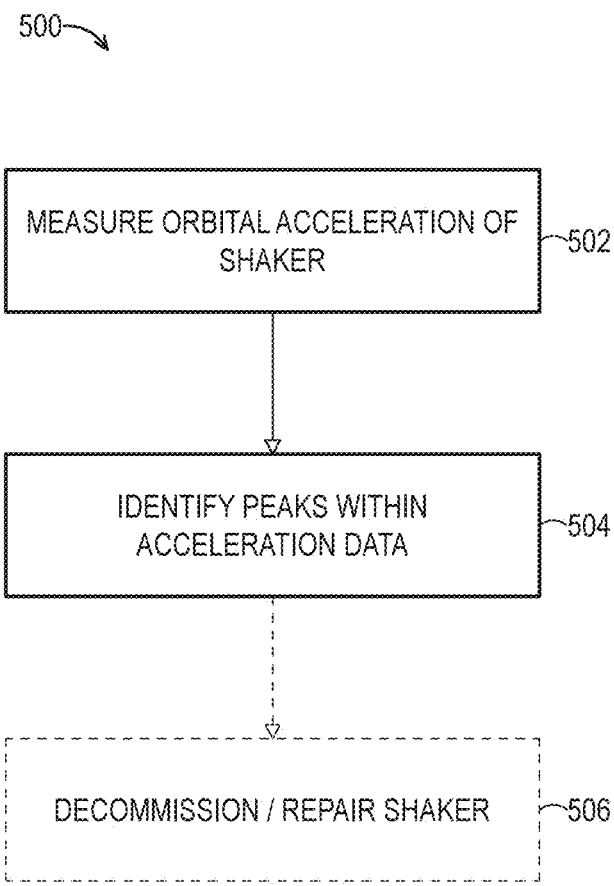
FIG. 11 is a flow chart depicting steps of a fourth illustrative method for monitoring the health of an orbital shaker according to the present teachings.

This section describes steps of an illustrative method 500 for monitoring the health of an orbital shaker; see FIG. 11. Aspects of illustrative shaker 100 may be utilized in the method steps described below. Where appropriate, reference may be made to components and systems that may be used in carrying out each step. These references are for illustration, and are not intended to limit the possible ways of carrying out any particular step of the method.

FIG. 11 is a flowchart illustrating steps performed in an illustrative method, and may not recite the complete process or all steps of the method. Although various steps of method 500 are described below and depicted in FIG. 11, the steps need not necessarily all be performed, and in some cases may be performed simultaneously or in a different order than the order shown.

Orbital shakers according to the present disclosure, such as orbital shaker 100, are configured to execute specific orbital motions to enable reproducible mixing of solutions in containers, such as 96 well plates. Deviations from this motion can lead to variation in assay performance and can be an indication of problems in the mechanical and electronic systems of the shaker. Accelerometer data provides a direct measurement of accelerations produced by shaker motion. Accordingly, 2-d histograms of acceleration vectors provide an indication of whether shaker motion is within specifications. Furthermore, time series acceleration data provides an indication of whether shakers are susceptible to stalling.

Step 502 of method 500 includes measuring, by an accelerometer, an orbital acceleration of a tray of the shaker. Accelerometer data provides a direct measurement of accelerations produced by a moving orbital shaker. In some examples, the measured accelerometer data comprises acceleration vectors corresponding to motion of the shaker in the x and y directions. In some examples, the measured accelerometer data comprises time series data corresponding to a total acceleration of the shaker tray over time.

Figure 12:
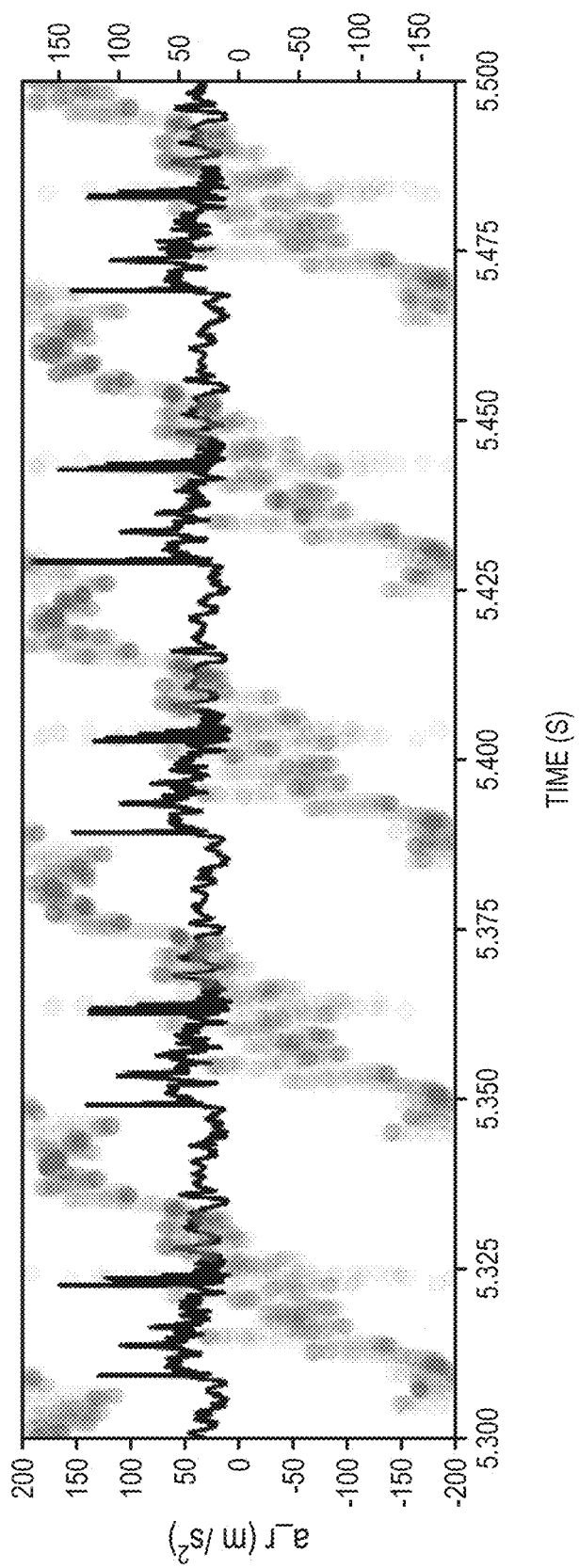
FIG. 12 is a graph depicting time series data of total acceleration over time of a stalling shaker.
Figure 13:
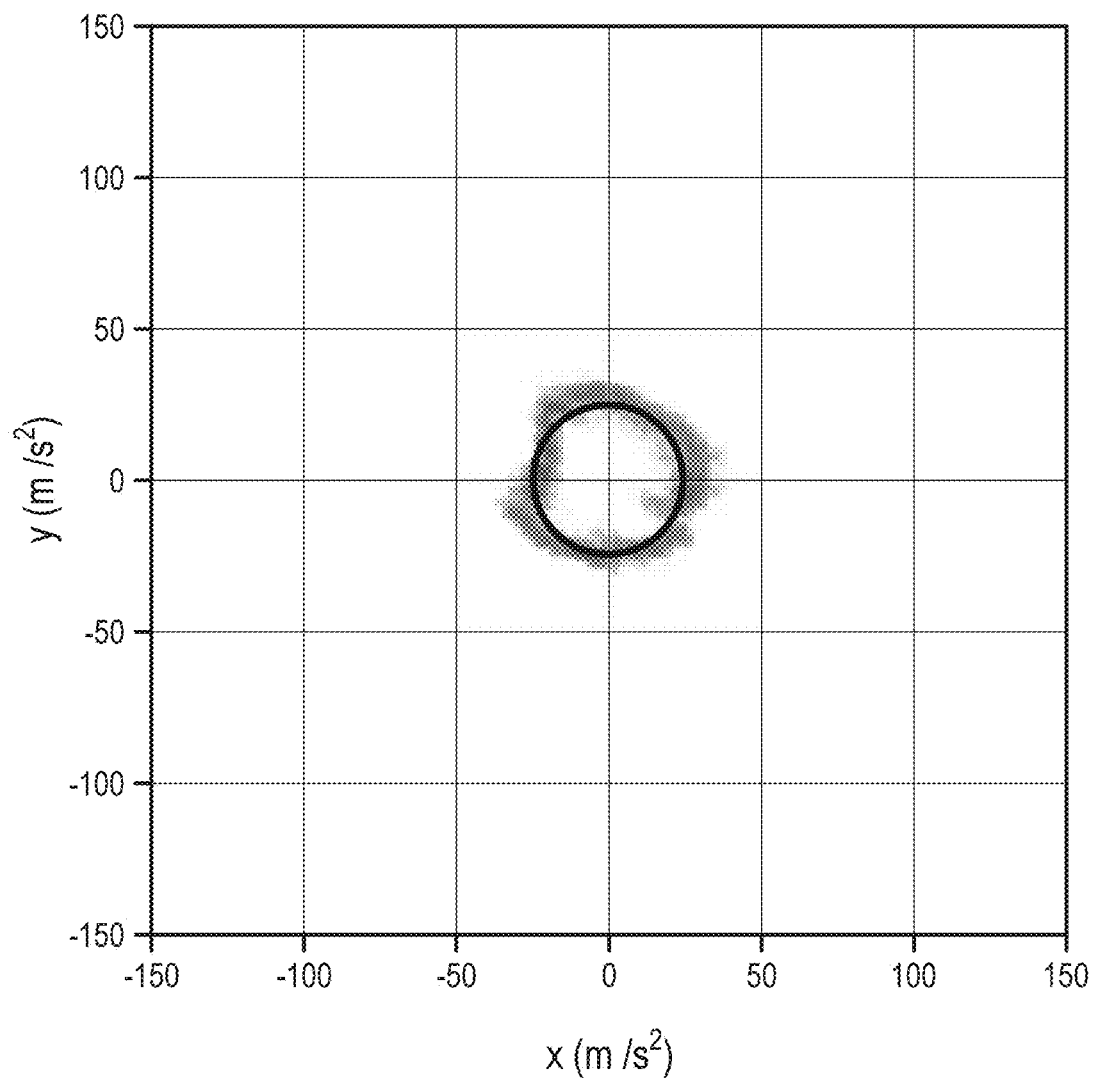
FIG. 13 is a two-dimensional histogram of x,y acceleration vectors detected by an accelerometer overlaid with an expected motion of the shaker tray.

Step 504 of method 500 includes identifying peaks within the measured orbital acceleration. FIG. 13 depicts a time series plot of a total acceleration of the shaker over time. Time series data may be utilized to identify high-frequency noise and large acceleration peaks within the data. For example, FIG. 12 depicts acceleration peaks approximately 6-8 times larger than the expected orbital acceleration of 25 m/s$^2$, indicating that the shaker is susceptible to stalling at a rotation speed of 1500 rpm. In some examples, step 504 of method 500 includes determining a threshold value indicating stalling. In some examples, the threshold value corresponds to an acceleration value, such as over 100 m/s², over 150 m/s², over 200 m/s², and/or the like. In some examples, the threshold value corresponds to a multiple of an expected value, such as at least 2×, at least 4×, at least 6×, at least 8×, and/or the like.

In some examples, step 506 of method 500 includes optionally comparing a two-dimensional histogram of the acceleration vectors of the tested shaker with a two-dimensional histogram of the acceleration vectors of an ideal shaker. An accelerometer according to the present teachings may be utilized to characterize vibrational noise and/or orbital dynamics of the shaker. The presence of excessive high frequency noise strongly correlates with shakers that will stall when operated at 1500 RPM. Accordingly, in some examples, step 506 of method 500 includes comparing a two-dimensional histogram of the measured x,y acceleration vectors of a shaker tray to a two-dimensional histogram of the x,y acceleration vectors of an ideal shaker. FIG. 13 depicts a two-dimensional histogram of the x,y acceleration of an orbital shaker tray. In the example depicted in FIG. 13, the two-dimensional histogram of the measured acceleration of the shaker tray is overlaid with a circle depicting an expected motion of the shaker tray. Specifically, the example of FIG. 13 depicts a 1 mm orbit at 1500 rotations per minute (rpm). An expected resultant orbital acceleration is approximately 25 m/s². FIG. 13 depicts that the x,y acceleration vectors match the expected motion of the shaker. In some examples, step 506 of method 500 includes identifying a degree of deviation between the measured x,y acceleration vectors and the ideal and/or expected x,y acceleration vectors. Deviations from this expected circle in the two-dimensional histogram provide insights into how the shaker motion is deviating from the expected dynamics and can provide insights into mechanisms of shaker stalling.

In some examples, step 508 of method 500 includes optionally repairing the orbital shaker in response to acceleration peaks. In some examples, step 508 of method 500 includes repairing the orbital shaker in response to an acceleration of the orbital shaker exceeding a threshold acceleration. In some examples, step 508 of method 500 includes repairing the orbital shaker in response to the acceleration of the orbital shaker exceeding 2×, 3×, 5×, 6×, 8×, 10×, and/or the like an expected orbital acceleration of the shaker. In some examples, step 508 of method 500 optionally includes decommissioning the shaker in response to observed acceleration peaks, such as when the acceleration of the orbital shaker exceeds a threshold acceleration. In some examples, step 508 of method 500 optionally includes performing maintenance on the shaker in response to response to acceleration peaks, such as when the acceleration of the orbital shaker exceeds a threshold acceleration. In some examples, step 508 of method 500 optionally includes decommissioning the shaker in response to a number of acceleration peaks exceeding a threshold number.

F. Illustrative Data Processing System

Figure 14:
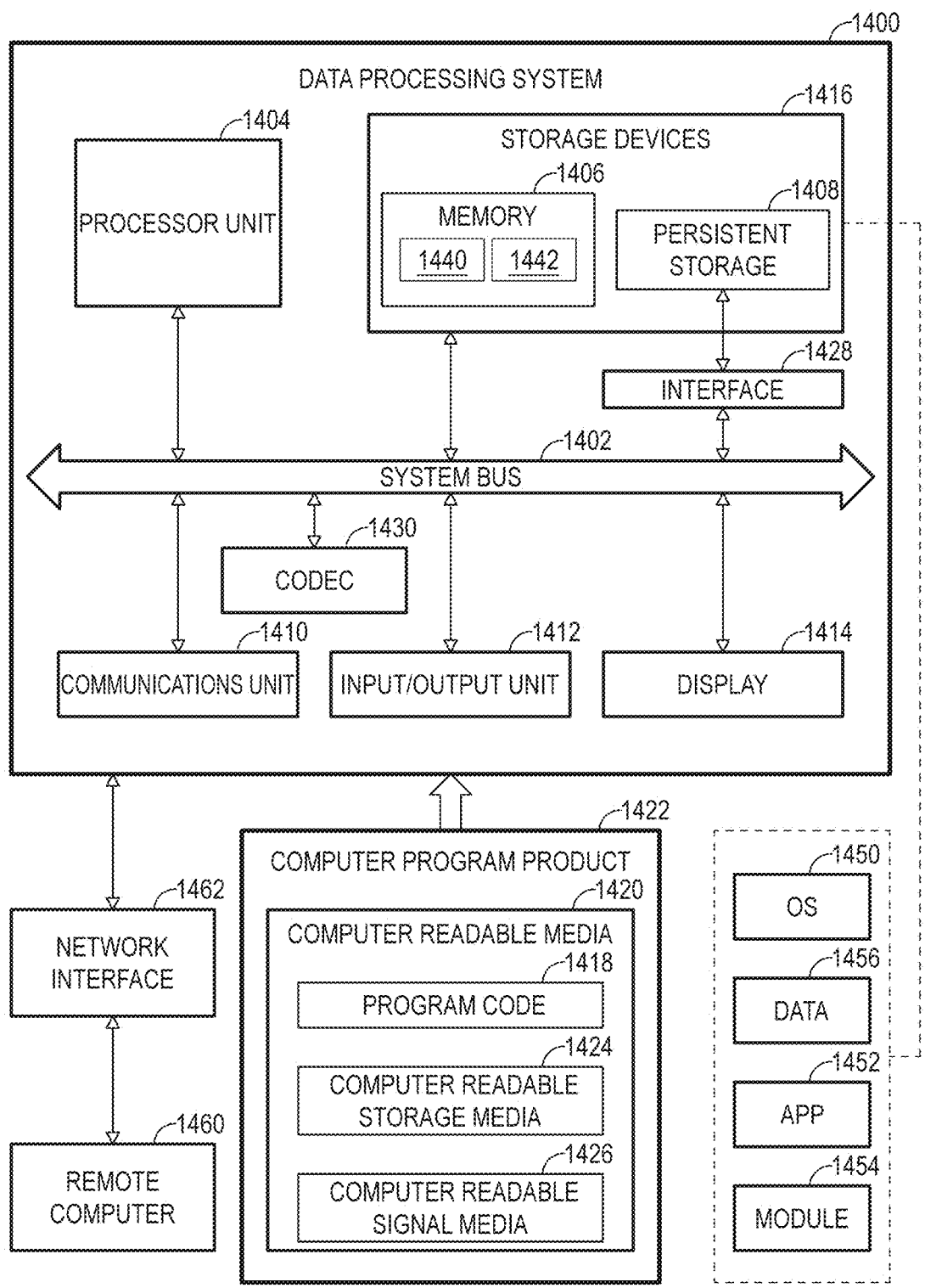
FIG. 14 is a schematic diagram of an illustrative data processing system suitable for use with the orbital shaker according to the present teachings.

As shown in FIG. 14, this example describes a data processing system 1400 (also referred to as a computer, computing system, and/or computer system) in accordance with aspects of the present disclosure. In this example, data processing system 1400 is an illustrative data processing system suitable for implementing aspects of the systems and methods for monitoring the health of orbital shakers described herein. More specifically, in some examples, devices that are embodiments of data processing systems (e.g., smartphones, tablets, personal computers) may be utilized to perform steps of illustrative methods for monitoring orbital shaker health, such as step 206 of method 200, step 306 of method 300, steps 404 and 406 of method 400, and/or the like. In some examples, motor controller 130 of shaker 100 comprises a device that is an embodiment of data processing system 1400.

In this illustrative example, data processing system 1400 includes a system bus 1402 (also referred to as communications framework). System bus 1402 may provide communications between a processor unit 1404 (also referred to as a processor or processors), a memory 1406, a persistent storage 1408, a communications unit 1410, an input/output (I/O) unit 1412, a codec 1430, and/or a display 1414. Memory 1406, persistent storage 1408, communications unit 1410, input/output (I/O) unit 1412, display 1414, and codec 1430 are examples of resources that may be accessible by processor unit 1404 via system bus 1402.

Processor unit 1404 serves to run instructions that may be loaded into memory 1406. Processor unit 1404 may comprise a number of processors, a multi-processor core, and/or a particular type of processor or processors (e.g., a central processing unit (CPU), graphics processing unit (GPU), etc.), depending on the particular implementation. Further, processor unit 1404 may be implemented using a number of heterogeneous processor systems in which a main processor is present with secondary processors on a single chip. As another illustrative example, processor unit 1404 may be a symmetric multi-processor system containing multiple processors of the same type.

Memory 1406 and persistent storage 1408 are examples of storage devices 1416. A storage device may include any suitable hardware capable of storing information (e.g., digital information), such as data, program code in functional form, and/or other suitable information, either on a temporary basis or a permanent basis.

Storage devices 1416 also may be referred to as computer-readable storage devices or computer-readable media. Memory 1406 may include a volatile storage memory 1440 and a non-volatile memory 1442. In some examples, a basic input/output system (BIOS), containing the basic routines to transfer information between elements within the data processing system 1400, such as during start-up, may be stored in non-volatile memory 1442. Persistent storage 1408 may take various forms, depending on the particular implementation.

Persistent storage 1408 may contain one or more components or devices. For example, persistent storage 1408 may include one or more devices such as a magnetic disk drive (also referred to as a hard disk drive or HDD), solid state disk (SSD), floppy disk drive, tape drive, Jaz drive, Zip drive, flash memory card, memory stick, and/or the like, or any combination of these. One or more of these devices may be removable and/or portable, e.g., a removable hard drive. Persistent storage 1408 may include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM). To facilitate connection of the persistent storage devices 1408 to system bus 1402, a removable or non-removable interface is typically used, such as interface 1428.

Input/output (I/O) unit 1412 allows for input and output of data with other devices that may be connected to data processing system 1400 (i.e., input devices and output devices). For example, an input device may include one or more pointing and/or information-input devices such as a keyboard, a mouse, a trackball, stylus, touch pad or touch screen, microphone, joystick, game pad, satellite dish, scanner, TV tuner card, digital camera, digital video camera, web camera, and/or the like. These and other input devices may connect to processor unit 1404 through system bus 1402 via interface port(s). Suitable interface port(s) may include, for example, a serial port, a parallel port, a game port, and/or a universal serial bus (USB).

One or more output devices may use some of the same types of ports, and in some cases the same actual ports, as the input device(s). For example, a USB port may be used to provide input to data processing system 1400 and to output information from data processing system 1400 to an output device. One or more output adapters may be provided for certain output devices (e.g., monitors, speakers, and printers, among others) which require special adapters. Suitable output adapters may include, e.g. video and sound cards that provide a means of connection between the output device and system bus 1402. Other devices and/or systems of devices may provide both input and output capabilities, such as remote computer(s) 1460. Display 1414 may include any suitable human-machine interface or other mechanism configured to display information to a user, e.g., a CRT, LED, or LCD monitor or screen, etc.

Communications unit 1410 refers to any suitable hardware and/or software employed to provide for communications with other data processing systems or devices. While communication unit 1410 is shown inside data processing system 1400, it may in some examples be at least partially external to data processing system 1400. Communications unit 1410 may include internal and external technologies, e.g., modems (including regular telephone grade modems, cable modems, and DSL modems), ISDN adapters, and/or wired and wireless Ethernet cards, hubs, routers, etc. Data processing system 1400 may operate in a networked environment, using logical connections to one or more remote computers 1460. A remote computer(s) 1460 may include a personal computer (PC), a server, a router, a network PC, a workstation, a microprocessor-based appliance, a peer device, a smart phone, a tablet, another network note, and/or the like. Remote computer(s) 1460 typically include many of the elements described relative to data processing system 1400. Remote computer(s) 1460 may be logically connected to data processing system 1400 through a network interface 1462 which is connected to data processing system 1400 via communications unit 1410. Network interface 1462 encompasses wired and/or wireless communication networks, such as local-area networks (LAN), wide-area networks (WAN), and cellular networks. LAN technologies may include Fiber Distributed Data Interface (FDDI), Copper Distributed Data Interface (CDDI), Ethernet, Token Ring, and/or the like. WAN technologies include point-to-point links, circuit switching networks (e.g., Integrated Services Digital networks (ISDN) and variations thereon), packet switching networks, and Digital Subscriber Lines (DSL).

Codec 1430 may include an encoder, a decoder, or both, comprising hardware, software, or a combination of hardware and software. Codec 1430 may include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec 1430 is depicted as a separate component, codec 1430 may be contained or implemented in memory, e.g., non-volatile memory 1442.

Non-volatile memory 1442 may include read only memory (ROM), programmable ROM (PROM), electrically programmable ROM (EPROM), electrically erasable programmable ROM (EEPROM), flash memory, and/or the like, or any combination of these. Volatile memory 1440 may include random access memory (RAM), which may act as external cache memory. RAM may comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs may be located in storage devices 1416, which are in communication with processor unit 1404 through system bus 1402. In these illustrative examples, the instructions are in a functional form in persistent storage 1408. These instructions may be loaded into memory 1406 for execution by processor unit 1404. Processes of one or more embodiments of the present disclosure may be performed by processor unit 1404 using computer-implemented instructions, which may be located in a memory, such as memory 1406.

These instructions are referred to as program instructions, program code, computer usable program code, or computer-readable program code executed by a processor in processor unit 1404. The program code in the different embodiments may be embodied on different physical or computer-readable storage media, such as memory 1406 or persistent storage 1408. Program code 1418 may be located in a functional form on computer-readable media 1420 that is selectively removable and may be loaded onto or transferred to data processing system 1400 for execution by processor unit 1404. Program code 1418 and computer-readable media 1420 form computer program product 1422 in these examples. In one example, computer-readable media 1420 may comprise computer-readable storage media 1424 or computer-readable signal media 1426.

Computer-readable storage media 1424 may include, for example, an optical or magnetic disk that is inserted or placed into a drive or other device that is part of persistent storage 1408 for transfer onto a storage device, such as a hard drive, that is part of persistent storage 1408. Computer-readable storage media 1424 also may take the form of a persistent storage, such as a hard drive, a thumb drive, or a flash memory, that is connected to data processing system 1400. In some instances, computer-readable storage media 1424 may not be removable from data processing system 1400.

In these examples, computer-readable storage media 1424 is a non-transitory, physical or tangible storage device used to store program code 1418 rather than a medium that propagates or transmits program code 1418. Computer-readable storage media 1424 is also referred to as a computer-readable tangible storage device or a computer-readable physical storage device. In other words, computer-readable storage media 1424 is media that can be touched by a person.

Alternatively, program code 1418 may be transferred to data processing system 1400, e.g., remotely over a network, using computer-readable signal media 1426. Computer-readable signal media 1426 may be, for example, a propagated data signal containing program code 1418. For example, computer-readable signal media 1426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1418 may be downloaded over a network to persistent storage 1408 from another device or data processing system through computer-readable signal media 1426 for use within data processing system 1400. For instance, program code stored in a computer-readable storage medium in a server data processing system may be downloaded over a network from the server to data processing system 1400. The computer providing program code 1418 may be a server computer, a client computer, or some other device capable of storing and transmitting program code 1418.

In some examples, program code 1418 may comprise an operating system (OS) 1450. Operating system 1450, which may be stored on persistent storage 1408, controls and allocates resources of data processing system 1400. One or more applications 1452 take advantage of the operating system's management of resources via program modules 1454, and program data 1456 stored on storage devices 1416. OS 1450 may include any suitable software system configured to manage and expose hardware resources of computer 1400 for sharing and use by applications 1452. In some examples, OS 1450 provides application programming interfaces (APIs) that facilitate connection of different type of hardware and/or provide applications 1452 access to hardware and OS services. In some examples, certain applications 1452 may provide further services for use by other applications 1452, e.g., as is the case with so-called "middleware." Aspects of present disclosure may be implemented with respect to various operating systems or combinations of operating systems.

The different components illustrated for data processing system 1400 are not meant to provide architectural limitations to the manner in which different embodiments may be implemented. One or more embodiments of the present disclosure may be implemented in a data processing system that includes fewer components or includes components in addition to and/or in place of those illustrated for computer 1400. Other components shown in FIG. 14 can be varied from the examples depicted. Different embodiments may be implemented using any hardware device or system capable of running program code. As one example, data processing system 1400 may include organic components integrated with inorganic components and/or may be comprised entirely of organic components (excluding a human being). For example, a storage device may be comprised of an organic semiconductor.

In some examples, processor unit 1404 may take the form of a hardware unit having hardware circuits that are specifically manufactured or configured for a particular use, or to produce a particular outcome or progress. This type of hardware may perform operations without needing program code 1418 to be loaded into a memory from a storage device to be configured to perform the operations. For example, processor unit 1404 may be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array (FPGA), and other suitable hardware devices. With this type of implementation, executable instructions (e.g., program code 1418) may be implemented as hardware, e.g., by specifying an FPGA configuration using a hardware description language (HDL) and then using a resulting binary file to (re) configure the FPGA.

In another example, data processing system 1400 may be implemented as an FPGA-based (or in some cases ASIC-based), dedicated-purpose set of state machines (e.g., Finite State Machines (FSM)), which may allow critical tasks to be isolated and run on custom hardware. Whereas a processor such as a CPU can be described as a shared-use, general purpose state machine that executes instructions provided to it, FPGA-based state machine(s) are constructed for a special purpose, and may execute hardware-coded logic without sharing resources. Such systems are often utilized for safety-related and mission-critical tasks.

In still another illustrative example, processor unit 1404 may be implemented using a combination of processors found in computers and hardware units. Processor unit 1404 may have a number of hardware units and a number of processors that are configured to run program code 1418. With this depicted example, some of the processes may be implemented in the number of hardware units, while other processes may be implemented in the number of processors.

In another example, system bus 1402 may comprise one or more buses, such as a system bus or an input/output bus. Of course, the bus system may be implemented using any suitable type of architecture that provides for a transfer of data between different components or devices attached to the bus system. System bus 1402 may include several types of bus structure(s) including memory bus or memory controller, a peripheral bus or external bus, and/or a local bus using any variety of available bus architectures (e.g., Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI)).

Additionally, communications unit 1410 may include a number of devices that transmit data, receive data, or both transmit and receive data. Communications unit 1410 may be, for example, a modem or a network adapter, two network adapters, or some combination thereof. Further, a memory may be, for example, memory 1406, or a cache, such as that found in an interface and memory controller hub that may be present in system bus 1402.

G. Illustrative Distributed Data Processing System

Figure 15:
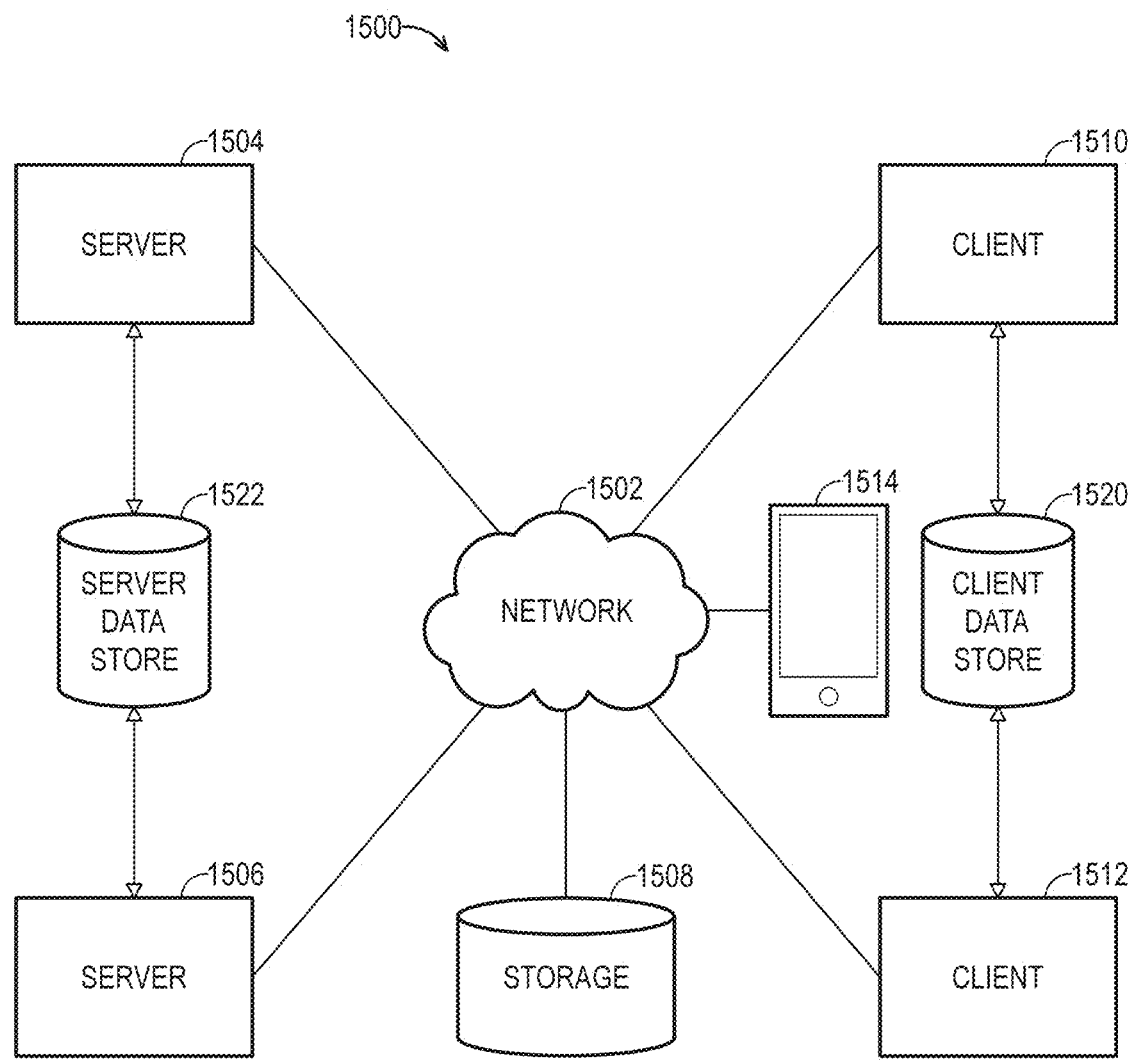
FIG. 15 is a schematic diagram of an illustrative network data processing system suitable for use with the orbital shaker according to the present teachings.

As shown in FIG. 15, this example describes a general network data processing system 1500, interchangeably termed a computer network, a network system, a distributed data processing system, or a distributed network, aspects of which may be utilized in illustrative embodiments of systems and methods for monitoring orbital shaker health. For example, shaker 100 may communicate over a network with motor controller 130 when motor controller 130 is a component of a distributed laboratory system.

It should be appreciated that FIG. 15 is provided as an illustration of one implementation and is not intended to imply any limitation with regard to environments in which different embodiments may be implemented. Many modifications to the depicted environment may be made.

Network system 1500 is a network of devices (e.g., computers), each of which may be an example of data processing system 1400, and other components. Network data processing system 1500 may include network 1502, which is a medium configured to provide communications links between various devices and computers connected within network data processing system 1500. Network 1502 may include connections such as wired or wireless communication links, fiber optic cables, and/or any other suitable medium for transmitting and/or communicating data between network devices, or any combination thereof.

In the depicted example, a first network device 1504 and a second network device 1506 connect to network 1502, as do one or more computer-readable memories or storage devices 1508. Network devices 1504 and 1506 are each examples of data processing system 1400, described above. In the depicted example, devices 1504 and 1506 are shown as server computers, which are in communication with one or more server data store(s) 1522 that may be employed to store information local to server computers 1504 and 1506, among others. However, network devices may include, without limitation, one or more personal computers, mobile computing devices such as personal digital assistants (PDAs), tablets, and smartphones, handheld gaming devices, wearable devices, tablet computers, routers, switches, voice gates, servers, electronic storage devices, imaging devices, media players, and/or other networked-enabled tools that may perform a mechanical or other function. These network devices may be interconnected through wired, wireless, optical, and other appropriate communication links.

In addition, client electronic devices 1510 and 1512 and/or a client smart device 1514, may connect to network 1502. Each of these devices is an example of data processing system 1400, described above regarding FIG. 14. Client electronic devices 1510, 1512, and 1514 may include, for example, one or more personal computers, network computers, and/or mobile computing devices such as personal digital assistants (PDAs), smart phones, handheld gaming devices, wearable devices, and/or tablet computers, and the like. In the depicted example, server 1504 provides information, such as boot files, operating system images, and applications to one or more of client electronic devices 1510, 1512, and 1514. Client electronic devices 1510, 1512, and 1514 may be referred to as "clients" in the context of their relationship to a server such as server computer 1504. Client devices may be in communication with one or more client data store(s) 1520, which may be employed to store information local to the clients (e.g., cookie(s) and/or associated contextual information). Network data processing system 1500 may include more or fewer servers and/or clients (or no servers or clients), as well as other devices not shown.

In some examples, first client electric device 1510 may transfer an encoded file to server 1504. Server 1504 can store the file, decode the file, and/or transmit the file to second client electric device 1512. In some examples, first client electric device 1510 may transfer an uncompressed file to server 1504 and server 1504 may compress the file. In some examples, server 1504 may encode text, audio, and/or video information, and transmit the information via network 1502 to one or more clients.

Client smart device 1514 may include any suitable portable electronic device capable of wireless communications and execution of software, such as a smartphone or a tablet. Generally speaking, the term "smartphone" may describe any suitable portable electronic device configured to perform functions of a computer, typically having a touchscreen interface, Internet access, and an operating system capable of running downloaded applications. In addition to making phone calls (e.g., over a cellular network), smartphones may be capable of sending and receiving emails, texts, and multimedia messages, accessing the Internet, and/or functioning as a web browser. Smart devices (e.g., smartphones) may include features of other known electronic devices, such as a media player, personal digital assistant, digital camera, video camera, and/or global positioning system. Smart devices (e.g., smartphones) may be capable of connecting with other smart devices, computers, or electronic devices wirelessly, such as through near field communications (NFC), BLUETOOTH®, WiFi, or mobile broadband networks. Wireless connectively may be established among smart devices, smartphones, computers, and/or other devices to form a mobile network where information can be exchanged.

Data and program code located in system 1500 may be stored in or on a computer-readable storage medium, such as network-connected storage device 1508 and/or a persistent storage 1408 of one of the network computers, as described above, and may be downloaded to a data processing system or other device for use. For example, program code may be stored on a computer-readable storage medium on server computer 1504 and downloaded to client 1510 over network 1502, for use on client 1510. In some examples, client data store 1520 and server data store 1522 reside on one or more storage devices 1508 and/or 1408.

Network data processing system 1500 may be implemented as one or more of different types of networks. For example, system 1500 may include an intranet, a local area network (LAN), a wide area network (WAN), or a personal area network (PAN). In some examples, network data processing system 1500 includes the Internet, with network 1502 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. In some examples, network 1502 may be referred to as a "cloud." In those examples, each server 1504 may be referred to as a cloud computing node, and client electronic devices may be referred to as cloud consumers, or the like. FIG. 15 is intended as an example, and not as an architectural limitation for any illustrative embodiments.

H. Illustrative Programmable Logic Controller

Figure 16:
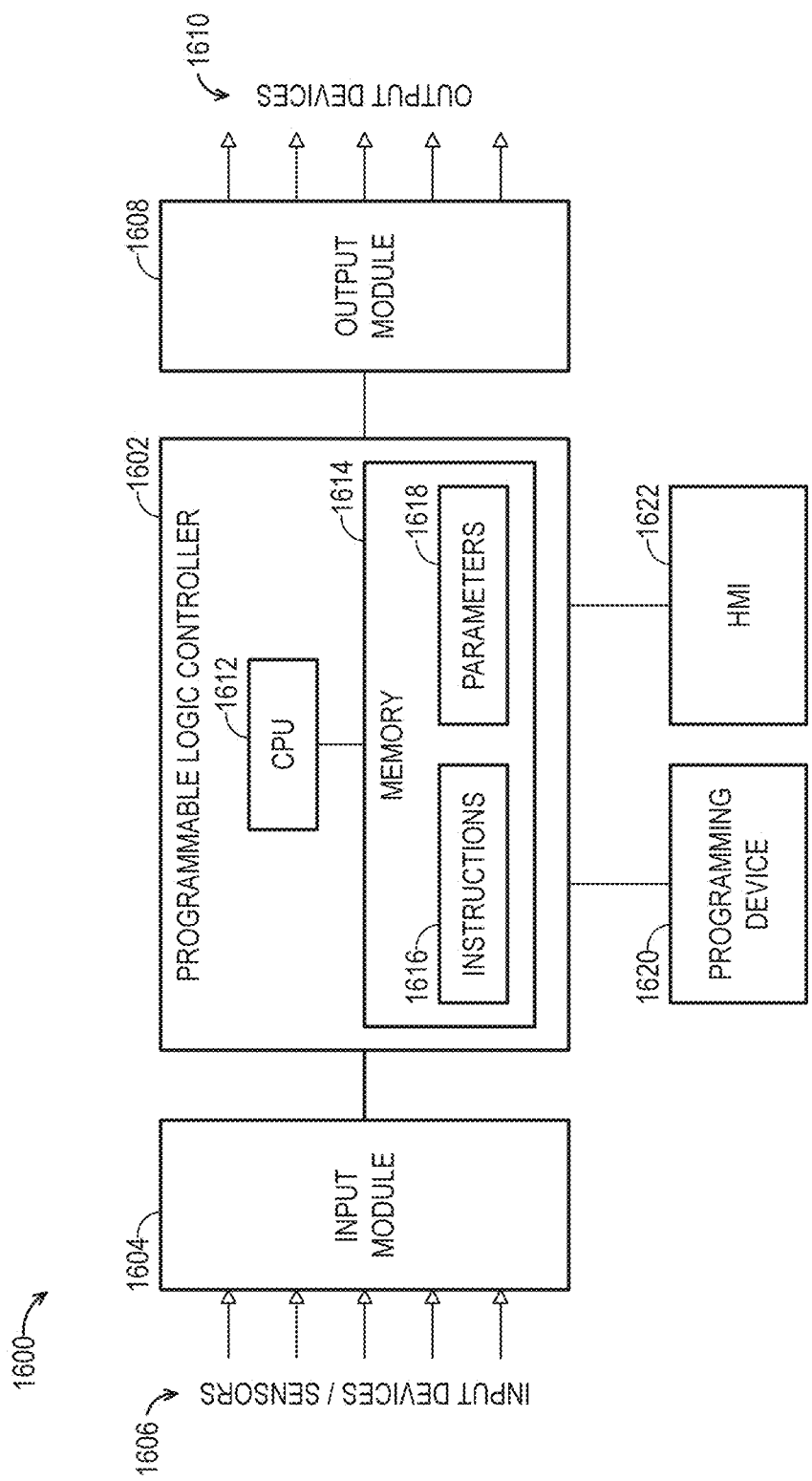
FIG. 16 is an illustrative programmable logic controller system suitable for use with the orbital shaker according to the present teachings.

As shown in FIG. 16, this section describes an illustrative programmable logic controller system 1600 (also referred to as a PLC system) suitable for implementing aspects of orbital shaker controls in accordance with aspects of the present disclosure. PLC system 1600 is a programmable controller used for automation of typical industrial processes, and is an embodiment of data processing system 1400, described above. In some examples, devices that are embodiments of a programmable logic controller system may be included in orbital shaker 100.

In this illustrative example, PLC system 1600 includes a programmable logic controller (PLC) 1602, also referred to as a controller. PLC 1602 includes a central processing unit (CPU) 1612, and a memory 1614 for storing instructions 1616 and parameters 1618 necessary to carry out the relevant automation tasks.

Central processing unit 1612 is an example of processor unit 1404, described above, and serves to execute software programs in the form of instructions 1616. The software programs may be loaded into memory 1614. Memory 1614, which is an example of storage device 1416 described above, may also store parameters 1618 needed for operation. A programming device 1620 may interface with PLC 1602 to facilitate the input of instructions and settings and/or to monitor equipment operation. Programming device 1620 may include, for example, a handheld computer or personal computer.

A human machine interface (HMI) 1622 may also be placed in communication with PLC 1602. HMI 1622 facilitates a user-friendly and interactive interface with the system processes and controls. Human machine interface 1622 may also assist an operator in determining machine conditions, in changing machine settings, and/or displaying faults.

PLC system 1600 includes an input module 1604 in receiving communication with one or more input devices/sensors 1606, and an output module 1608 in outgoing communication with one or more output devices 1610. Both modules 1604 and 1608 are hardware devices in communication with PLC 1602. In some examples, communication with PLC 1602 may be carried out via an optical (or otherwise wireless) interface, such that PLC 1602 is electrically isolated from the input and output modules.

Input module 1604 may convert analog signals from input devices/sensors 1606 into digital and/or logic signals that the PLC can use. Signal types may be digital or analog. With these signals the CPU may evaluate the status of the inputs. Upon evaluating the input(s), along with known output states and stored program parameters and instructions, the CPU may execute one or more predetermined commands to control the one or more output devices. Output module 1608 may convert control signals from the CPU into digital or analog signals which may be used to control the various output devices.

HMI 1622 and programming device 1620 may provide for communications with other data processing systems or devices, e.g., through the use of physical and/or wireless communications links.

Modules 1604 and 1608 allow for input and output of data with other devices that may be connected to PLC 1602. For example, input module 1604 may provide a connection for temperature or pressure measurements, valve or machine status, tank level status, user input through a keyboard, a mouse, and/or any other suitable input device. Output module 1608 may send output to an actuator, indicator, motor controller, printer, machine, display, and/or any other suitable output device.

I. Illustrative Combinations and Additional Examples

This section describes additional aspects and features of illustrative systems and methods for monitoring shaker health, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A method for monitoring the health of an orbital shaker, the method comprising:
varying an input current delivered to a drive motor by applying two or more selected input current values to the drive motor;
determining a stalling frequency of the drive motor at each selected input current;
calculating an input current above which a stalling frequency of the drive motor is zero.

A1. The method of paragraph A0, wherein the selected current values are selected such that at least one current value is greater than a default current delivered to the drive motor, and such that at least one current value is less than the default current delivered to the drive motor.

A2 The method of paragraph A0 or A1, wherein the selected current values are selected to be evenly distributed between 0% and 100% of a maximum current of the orbital shaker.

A3. The method of any of paragraphs A0 through A2, wherein varying the input current delivered to the drive motor includes performing multiple tests at each selected current value.

A4. The method of paragraph A3, wherein each test of the multiple tests includes operating the orbital shaker for a selected time interval.

A5 The method of paragraph A4, wherein the selected time interval is selected to be greater than an acceleration time of the drive motor.

A6. The method of paragraph A5, wherein the selected time interval is greater than 5 seconds.

A7. The method of any of paragraphs A3 through A6, further comprising performing at least 10 tests at each input current.

A8. The method of any of paragraphs A0 through A7, wherein determining a stalling frequency of the drive motor at each selected input current includes counting a number of stalling events at each selected input current.

A9. The method of paragraph A8, wherein determining a stalling frequency of the drive motor at each selected input current includes dividing the counted number of stalling events by a/the number of tests performed at each selected input current to provide a fraction of successful events.

A10. The method of paragraph A9, wherein determining a stalling frequency of the drive motor at each selected input current includes inverting the fraction of successful events to provide the stalling frequency.

A11. The method of any of paragraphs A0 through A10, further comprising:
increasing a default input current of the orbital shaker such that the default input current is greater than the input current above which the stalling frequency of the drive motor is zero.

A12. The method of any of paragraphs A0 through A10, further comprising:
by a motor controller, automatically increasing a default input current of the orbital shaker such that the default input current is greater than the input current above which the stalling frequency of the drive motor is zero.

A13. The method of paragraph A11 or A12, further comprising:
decommissioning the orbital shaker if the input current above which the stalling frequency of the drive motor is zero is greater than a maximum input current of the orbital shaker.

A14. The method of any of paragraphs A0 through A10, further comprising:
 decommissioning the orbital shaker if the input current above which the stalling frequency of the drive motor is zero is greater than a default input current of the orbital shaker.

A15. The method of any of paragraphs A0 through A10, further comprising:
 decommissioning the orbital shaker if the input current above which the stalling frequency of the drive motor is zero is within 10% of a default input current of the orbital shaker.

A16. The method of any of paragraphs A0 through A15, wherein calculating an input current above which the stalling frequency of the drive motor is zero comprises plotting the stalling frequency against the input current and fitting a four-parameter logistic curve to the stalling frequency data.

B0. A method for monitoring the health of an orbital shaker, the method comprising:
 applying an input current to an electric motor of the orbital shaker via a power line;
 monitoring an operational current of the power line; and
 detecting negative current events within the power line;
 wherein the negative current events indicate mechanical hitches during shaker rotation.

B1. The method of paragraph B0, wherein the electric motor comprises a stepper motor.

B2. The method of paragraphs B0 or B1, wherein monitoring an operational current of the power line comprises monitoring a voltage of a power fault circuit configured to detect a presence of the orbital shaker.

B3. The method of paragraph B2, wherein detecting negative current events includes detecting decreases in the voltage of the power fault circuit.

B4. The method of paragraphs B0 or B1, wherein monitoring the operational current of the power line comprises comparing the operational current of the power line to a ground current of a ground line.

B5. The method of paragraph B4, wherein detecting negative current events includes detecting when the operational current drops below the ground current.

B6. The method of any of paragraphs B0 through B5, further comprising:
 in response to the detected negative current events, repairing the orbital shaker.

B7. The method of any of paragraphs B0 through B5, further comprising:
 in response to the detected negative current events, decommissioning the orbital shaker.

B8. The method of any of paragraphs B0 through B7, further comprising:
 in response to the detected negative current events, increasing an input current of the orbital shaker.

C0. A method for monitoring the health of an orbital shaker, the method comprising:
 applying visual identifiers to at least one drive shaft and at least one idler shaft of an orbital shaker;
 tracking rotational positions of each visual identifier; and
 calculating angular offsets between the rotational positions of visual identifiers corresponding to the at least one drive shaft and the rotational positions of visual identifiers corresponding to the at least one idler shaft.

C1. The method of paragraph C0,
 wherein tracking rotational positions of each visual identifier includes recording, by a camera, rotational positions of each visual identifier while the orbital shaker is in use.

C2. The method of paragraph C0 or C1, wherein calculating angular offsets between the rotational positions of visual identifiers corresponding to the at least one drive shaft and the rotational positions of visual identifiers corresponding to the at least one idler shaft comprises calculating a best fit ellipse overlaying the rotational positions of each visual identifier.

C3. The method of paragraph C2, further comprising plotting the rotational positions of visual identifiers corresponding to the at least one idler shaft against the rotational positions of visual identifiers corresponding to the at least one drive shaft.

C4. The method of paragraph C2, further comprising, in response to the angular offsets of the visual identifiers corresponding to the at least one idler shaft exceeding a threshold angular offset value, decommissioning the orbital shaker.

C5. The method of paragraph C4, wherein the threshold angular offset value comprises 10 degrees.

D0. A method for monitoring the health of an orbital shaker, the method comprising:
 measuring, by an accelerometer, an orbital acceleration of a tray of the shaker; and
 identifying peaks within the measured orbital acceleration.

D1. The method of paragraph D0, further comprising:
 identifying high-frequency noise within the measured orbital acceleration.

D2. The method of paragraph D0 or D1, wherein identifying peaks within the measured orbital acceleration comprises comparing the measured orbital acceleration to an expected orbital acceleration.

D3. The method of any of paragraphs D0 through D2, further comprising decommissioning the orbital shaker when the measured orbital acceleration satisfies a threshold value.

D4. The method of any of paragraphs D0 through D4, further comprising decommissioning the orbital shaker when the measured orbital acceleration is at least 4 times greater than an expected orbital acceleration.

D5. The method of any of paragraphs D0 through D4, further comprising decommissioning the orbital shaker when the measured orbital acceleration exceeds 100 m/s$^2$.

D6. The method of any of paragraphs D0 through D2, further comprising repairing the orbital shaker when the measured orbital acceleration satisfies a threshold value.

D7. The method of any of paragraphs D0 through D2 and D6, further comprising repairing the orbital shaker when the measured orbital acceleration is at least 4 times greater than an expected orbital acceleration.

D8. The method of any of paragraphs D0 through D2 and D6, further comprising repairing the orbital shaker when the measured orbital acceleration exceeds 100 m/s$^2$.

Advantages, Features, and Benefits

The different embodiments and examples of the systems and methods for monitoring shaker health described herein provide several advantages over known solutions for preventing stalling within orbital shakers. For example, illustrative embodiments and examples described herein allow a user to replace or repair a shaker before the end of the shaker's life to avoid a costly failure while the shaker is in use. Similarly, illustrative embodiments and examples described herein allow a user to monitor shaker health to avoid experimental errors resulting from inconsistent shaking.

Additionally, and among other benefits, illustrative embodiments and examples described herein decouple operational current from tested current, allowing a user to monitor the shaker in use cases that require all input current to be utilized.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A method for monitoring a health of an orbital shaker, the method comprising:
varying an input current delivered to a drive motor by applying two or more selected input current values to the drive motor;
determining a stalling frequency of the drive motor at each selected input current;
calculating an input current above which a stalling frequency of the drive motor is zero; and
delivering an input current to the drive motor that is greater than the input current above which a stalling frequency of the drive motor is zero.

2. The method of claim 1, wherein varying the input current delivered to the drive motor includes performing multiple tests at each selected current value, wherein each test of the multiple tests includes operating the orbital shaker for a selected time interval, and wherein the selected time interval is selected to be greater than an acceleration time of the drive motor.

3. The method of claim 1, wherein determining a stalling frequency of the drive motor at each selected input current includes counting a number of stalling events at each selected input current.

4. The method of claim 1, wherein calculating an input current above which the stalling frequency of the drive motor is zero comprises plotting the stalling frequency against the input current and fitting a four-parameter logistic curve to the determined stalling frequency of the drive motor at each selected input current.

5. The method of claim 1, further comprising:
increasing a default input current of the orbital shaker such that the default input current is greater than the input current above which the stalling frequency of the drive motor is zero.

6. The method of claim 1, further comprising:
by a motor controller, automatically increasing a default input current of the orbital shaker such that the default input current is greater than the input current above which the stalling frequency of the drive motor is zero.

7. The method of claim 1, further comprising:
decommissioning the orbital shaker if the input current above which the stalling frequency of the drive motor is zero is greater than a maximum input current of the orbital shaker.

8. The method of claim 1, further comprising:
decommissioning the orbital shaker if the input current above which the stalling frequency of the drive motor is zero is greater than a default input current of the orbital shaker.

9. A method for monitoring a health of an orbital shaker, the method comprising:
applying an input current to an electric motor of the orbital shaker via a power line;
monitoring an operational current of the power line by comparing the operational current of the power line to a ground current of a ground line; and
detecting negative current events within the power line by detecting when the operational current drops below the ground current; and
decommissioning the orbital shaker in response to a number of detected negative current events exceeding a designated threshold value;
wherein the negative current events indicate mechanical hitches during shaker rotation.

10. The method of claim 9, wherein the electric motor comprises a stepper motor.

11. The method of claim 9, wherein monitoring an operational current of the power line comprises monitoring a voltage of a power fault circuit configured to detect a presence of the orbital shaker.

12. The method of claim 11, wherein detecting negative current events includes detecting decreases in the voltage of the power fault circuit.

13. A method for monitoring a health of an orbital shaker, the method comprising:
applying visual identifiers to at least one drive shaft and at least one idler shaft of an orbital shaker;
tracking rotational positions of each visual identifier;
calculating angular offsets between the rotational positions of visual identifiers corresponding to the at least one drive shaft and the rotational positions of visual identifiers corresponding to the at least one idler shaft;
wherein calculating angular offsets between the rotational positions of visual identifiers corresponding to the at least one drive shaft and the rotational positions of visual identifiers corresponding to the at least one idler shaft comprises calculating a best fit ellipse overlaying the rotational positions of each visual identifier; and
in response to the angular offsets of the visual identifiers corresponding to the at least one idler shaft exceeding a threshold angular offset value, decommissioning the orbital shaker.

14. The method of claim 13, wherein tracking rotational positions of each visual identifier includes recording, by a camera, rotational positions of each visual identifier while the orbital shaker is in use.

15. The method of claim 13, further comprising plotting the rotational positions of visual identifiers corresponding to the at least one idler shaft against the rotational positions of visual identifiers corresponding to the at least one drive shaft.

16. The method of claim 13, wherein the threshold angular offset value comprises 10 degrees.

\* \* \* \* \*